(12) United States Patent
Takahashi

(10) Patent No.: US 9,891,992 B2
(45) Date of Patent: Feb. 13, 2018

(54) INFORMATION PROCESSING APPARATUS, INFORMATION PROCESSING METHOD, STORAGE SYSTEM AND NON-TRANSITORY COMPUTER READABLE STORAGE MEDIA

(71) Applicant: NEC Corporation, Minato-ku, Tokyo (JP)

(72) Inventor: Hideyuki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 3 days.

(21) Appl. No.: 14/173,031

(22) Filed: Feb. 5, 2014

(65) Prior Publication Data

US 2014/0289489 A1  Sep. 25, 2014

(30) Foreign Application Priority Data

Mar. 21, 2013 (JP) ................................ 2013-058473

(51) Int. Cl.
*G06F 11/10* (2006.01)
*G06F 3/06* (2006.01)

(52) U.S. Cl.
CPC ........ *G06F 11/1076* (2013.01); *G06F 3/0689* (2013.01); *G06F 2211/1023* (2013.01); *G06F 2211/1028* (2013.01)

(58) Field of Classification Search
CPC ........... G06F 3/0689; G06F 11/1076–11/1096; G06F 2211/1002–2211/1095
See application file for complete search history.

(56) References Cited

U.S. PATENT DOCUMENTS

| | | | |
|---|---|---|---|
| 6,023,780 A * | 2/2000 | Iwatani | 714/770 |
| 2004/0162953 A1 | 8/2004 | Yoshida et al. | |
| 2005/0102551 A1* | 5/2005 | Watanabe | G06F 3/0607 714/6.2 |
| 2005/0114594 A1* | 5/2005 | Corbett et al. | 711/114 |
| 2005/0262038 A1 | 11/2005 | Sepez et al. | |
| 2007/0180299 A1* | 8/2007 | Kim | G06F 11/1076 714/6.22 |
| 2008/0155191 A1 | 6/2008 | Anderson et al. | |

(Continued)

FOREIGN PATENT DOCUMENTS

| | | |
|---|---|---|
| JP | 10-107748 A | 4/1998 |
| JP | 2000-099275 A | 4/2000 |

(Continued)

OTHER PUBLICATIONS

Japanese Office Action for JP Application No. 2013-058473 dated Jan. 17, 2017 with English Translation.

*Primary Examiner* — Nicholas Simonetti

(57) ABSTRACT

An information processing apparatus can prevent performance deterioration, and maintain fault tolerance, in a storage system having storage nodes of different capacities. The apparatus includes a data writing unit to divide received data into divided data, generate a parity data usable when re-configuring the received data having an error, and write divided data and parity data in storage nodes. The apparatus includes a relocation unit to assign a relocation position of the data based on a predetermined condition and store the data in the assigned storage nodes. The apparatus includes a data reading unit to read the divided data so as not to read parity data stored in the storage nodes by identifying the parity data.

9 Claims, 19 Drawing Sheets

(56) References Cited

U.S. PATENT DOCUMENTS

2009/0144497 A1*  6/2009  Withers ........................ 711/114
2010/0049917 A1*  2/2010  Kono et al. ................... 711/114

FOREIGN PATENT DOCUMENTS

| JP | 2004-252663 A | 9/2004 |
| JP | 2010-238038 A | 10/2010 |
| JP | 4696089 B2 | 6/2011 |
| JP | 2011-170665 A | 9/2011 |

* cited by examiner

Fig. 10

| DATA BLOCK k ||
|---|---|
| ORIGINAL FRAGMENT (OF) | PARITY FRAGMENT (PF) |
| 1:1−1−xxxx | 1:4−2−yyyy |
| 2:2−1−xxxx | 2:5−2−yyyy |
| ... | ... |
| m:6−4−xxxx | n:6−5−yyyy |

INFORMATION PROCESSING APPARATUS, INFORMATION PROCESSING METHOD, STORAGE SYSTEM AND NON-TRANSITORY COMPUTER READABLE STORAGE MEDIA

This application is based upon and claims the benefit of priority from Japanese Patent Application No. 2013-058473, filed on Mar. 21, 2013, the disclosure of which is incorporated herein in its entirety by reference.

TECHNICAL FIELD

The present invention relates to a technical field for storing data in a plurality of storage devices in a distributed manner.

BACKGROUND ART

Japanese Patent Application Laid-open Publication No. 2013-058473 discloses a storage apparatus with a redundant disk array unit, in which a first disk-array control unit is capable of using a cache memory of a second disk-array control unit.

In recent years, a storage system which can extend the capacity and the performance by performing addition and exchange of a storage node (grid storage system) has been proposed. Such storage system stores data in a state that the data is distributed in a plurality of storage nodes. Also, generally, such storage system is often designed so that data may be stored equally to a plurality of storage nodes in order to give consideration to performance and fault tolerance.

For example, Patent document 1 discloses a technology about a distributed storage system including a plurality of interface processors and a plurality of storage devices. Specifically, Patent document 1 discloses a technology in which an interface processor and a storage device store a node list including an IP address of at least one storage device and an interface processor controls a storage device based on the node list.

Patent document 2 discloses a technology about a distributed file system including a data relocation processor. Specifically, Patent document 2 discloses a technology which calculates a relocation position of data of a file for which relocation of data is uncompleted and exchanges data between each storage node based on the calculation result.

Meanwhile, as an example of a technology about parity for detecting erroneous data, Patent document 3 discloses a technology about data reading processing in a receiving device of a data broadcasting system. Specifically, Patent document 3 discloses a technology in which a judgment is performed based on data read by a receiving device, and, when the data which has been read is normal data, data about parity that is unnecessary is not read.

[Patent document 1] Japanese Patent Publication No. 4696089
[Patent document 2] Japanese Patent Application Laid-Open No. 2010-238038
[Patent document 3] Japanese Patent Application Laid-Open No. 1998-107748

Solution to Problem

The technologies disclosed in Patent document 1 and Patent document 2 do not consider about a storage capacity up to which a storage device (storage node) can store (memorize) data (hereinafter, it is abbreviated as "capacity"). For example, in a case of a storage system including storage devices having different capacities, the technologies disclosed in Patent document 1 and Patent document 2 cannot use the storage area of a large capacity storage device sufficiently. As a result, when the technologies disclosed in Patent document 1 and Patent document 2 try to use a storage area sufficiently, there is a risk that performance deterioration is caused. The first reason is that, in these technologies, when data is written according to a capacity (that is, when, on the occasion of writing data in a storage node, data of a capacity according to the capacity of the storage node is written), a storage node having a large capacity will be a bottleneck. For this reason, there is a risk that the writing performance declines compared with a case when data is written in each storage node equally. The second reason is that, in these technologies, when data is written in each storage node equally and, after that, data is relocated according to a capacity (that is, when, on the occasion of arranging data in a storage node, data of a capacity according to the capacity of the storage node is arranged), a storage node of a large amount of data will be a bottleneck. For this reason, there is a risk that the read performance declines compared with a case when data is stored equally.

The technologies disclosed in the above-mentioned Patent document 1 and Patent document 2 does not consider the capacity of a storage device. For this reason, when parity data is stored in a certain storage node intensively, there is a risk that fault tolerance cannot be kept.

In view of the above-mentioned subjects, one object of the present invention is to provide, in a storage system having storage nodes of different capacities, an information processing apparatus or the like capable of preventing performance deterioration, and of keeping fault tolerance.

SUMMARY OF INVENTION

In order to achieve the above-mentioned object, an information processing device according to the present invention is characterized by the following structure.

That is, an information processing apparatus, including:
a data writing unit to divide received data into a plurality of divided data, generate a plurality of parity data usable when re-configuring the received data having an error, and write divided data and parity data in a plurality of storage nodes;
a relocation unit to assign a relocation position of the data written by the data writing unit to the plurality of storage nodes based on a predetermined condition and store the data in the assigned storage nodes; and
a data reading unit to read the divided data so as not to read parity data stored in the plurality of storage nodes by identifying the parity data.

An information processing method as a further aspect of the present invention includes:
dividing received data into a plurality of divided data, generating a plurality of parity data usable when re-configuring the received data having an error, and writing the divided data and the parity data to a plurality of storage nodes;
assigning a relocation position of the data written by the data writing unit to the plurality of storage nodes based on a predetermined condition and store the data in the assigned storage nodes; and
reading the divided data so as not to read parity data stored in the plurality of storage nodes by identifying the parity data.

A computer program as a further aspect of the present invention makes a computer executes:

processing of dividing received data into a plurality of divided data, generating a plurality of parity data usable when re-configuring the received data having an error, and transmitting the divided data and the parity data to a plurality of storage nodes;

processing of assigning a relocation position of the data written by the data writing unit to the plurality of storage nodes based on a predetermined condition and store the data in the assigned storage nodes; and processing of reading the divided data so as not to read parity data stored in the plurality of storage nodes by identifying the parity data.

Meanwhile, such object can also be achieved by a computer-readable storage medium in which the computer program is stored.

According to an information processing apparatus of the present invention, in a storage system having storage nodes of different capacities, it is possible to prevent performance deterioration, and keep fault tolerance.

BRIEF DESCRIPTION OF THE DRAWINGS

FIG. 10 is a diagram exemplifying metadata which indicates storage position information on a fragment in the first exemplary embodiment of the present invention.

EXEMPLARY EMBODIMENT

First Exemplary Embodiment

Figure 1:
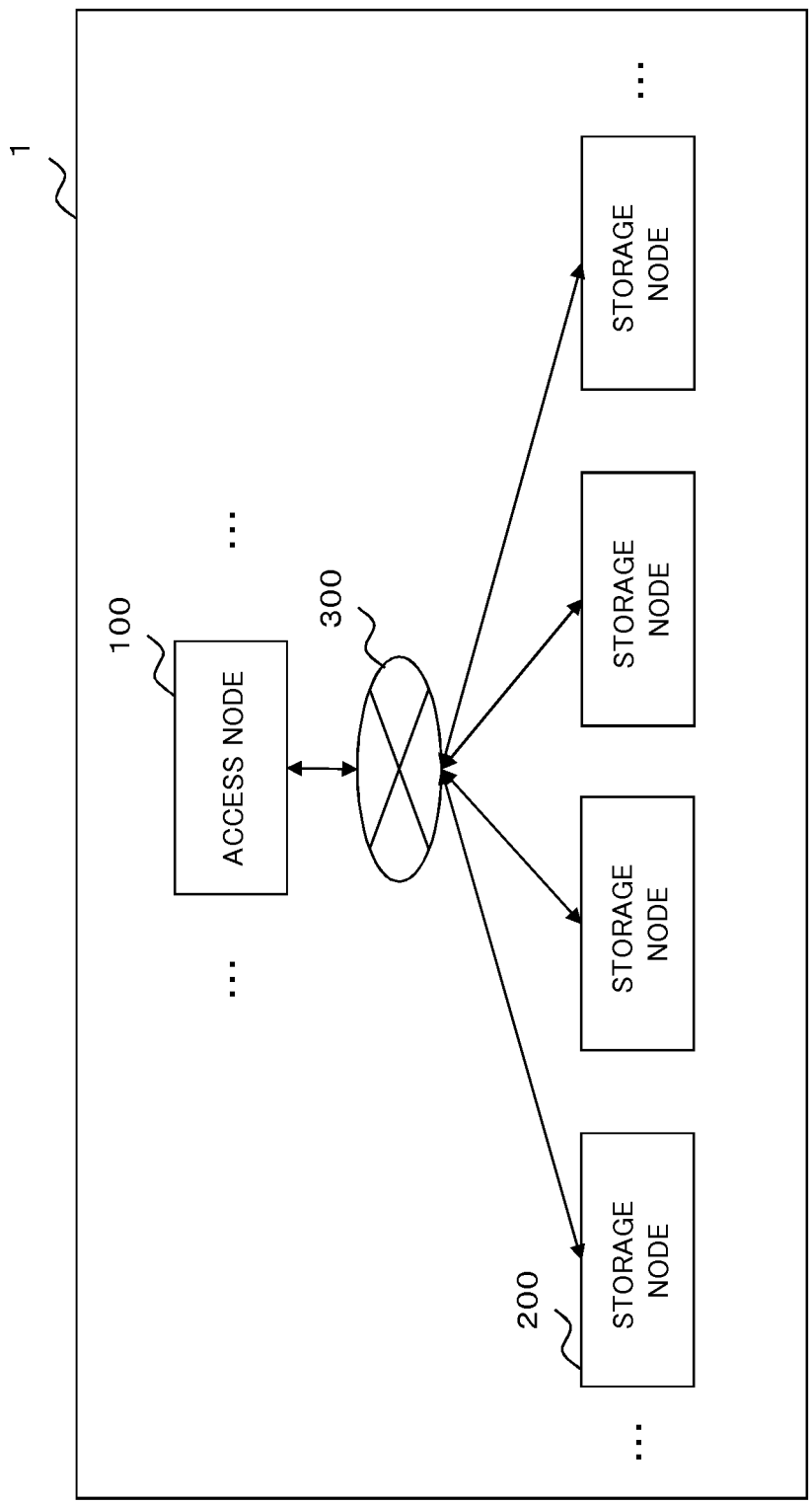
FIG. 1 is a block diagram exemplifying a structure of a storage system 1 according to a first exemplary embodiment of the present invention.

First, a storage system 1 according to the first exemplary embodiment of the present invention will be described. FIG. 1 is a block diagram exemplifying a structure of the storage system 1 according to the first exemplary embodiment of the present invention. As shown in FIG. 1, the storage system 1 is configured by an access node (AN) 100 and a storage node (SN) 200 connected so as to be able to communicate with each other via a network 300. The storage system 1 is assumed as a storage system capable of extending its capacity and performance by addition and exchange of a node. The access node 100 performs management, control and the like of data stored in the storage node 200 mainly. Detailed description about the access node 100 will be made later. Also, in this exemplary embodiment, although one access node 100 is described, the storage system 100 may be configured such that a plurality of access node 100 is connected to a plurality of storage node 200.

Figure 2:
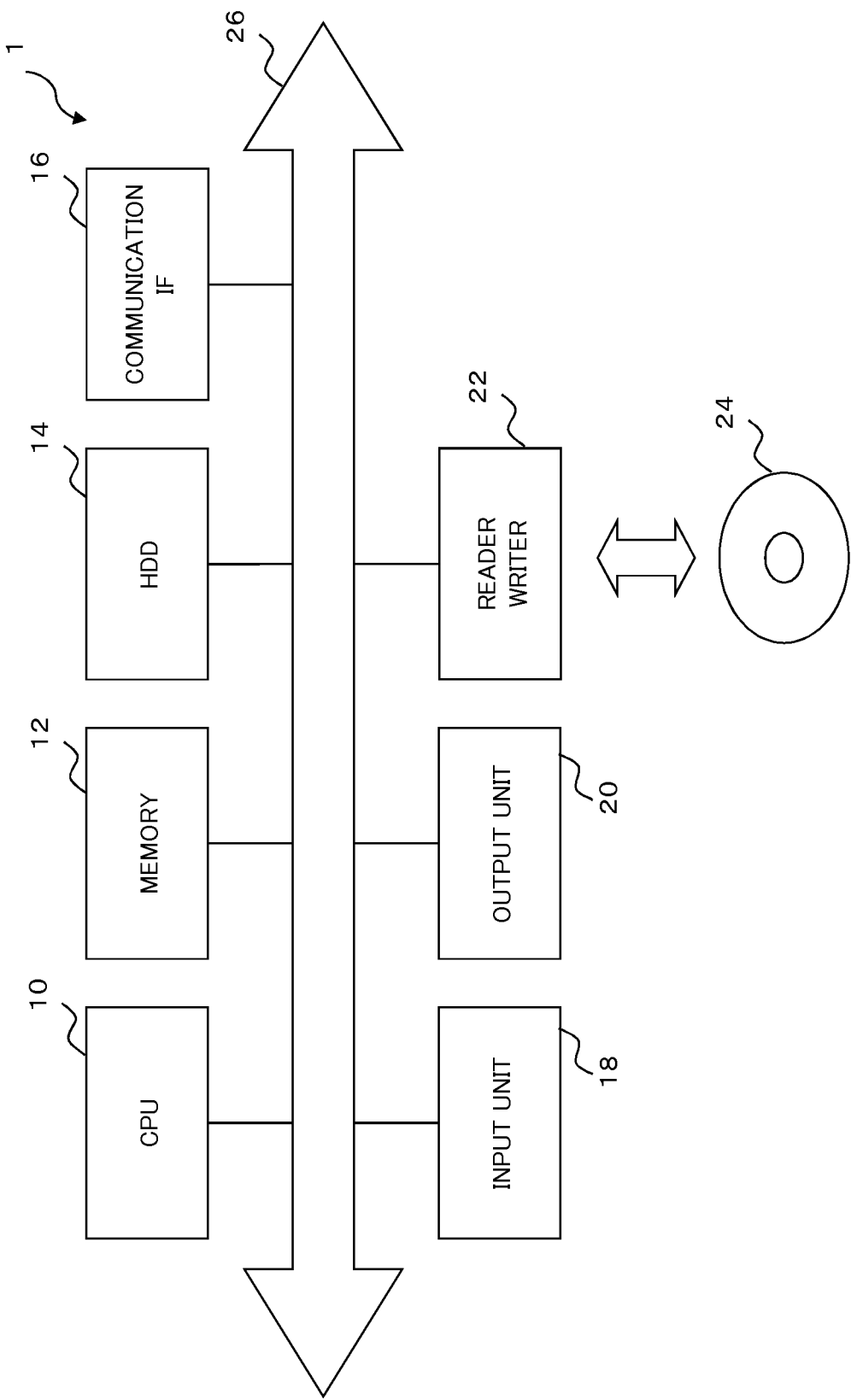
FIG. 2 is a diagram showing a hardware exemplary configuration of an information processing apparatus (computer) which can realize an access node 100 and a storage node 200 which constitute the storage system 1 according to the first exemplary embodiment of the present invention.

FIG. 2 is a diagram showing a hardware exemplary configuration of an information processing apparatus (computer) which can realize the access node 100 and the storage node 200 of which the storage system 1 according to the first exemplary embodiment of the present invention is composed. As shown in FIG. 2, an information processing apparatus 1 has a CPU (Central Processing Unit) 10, a memory 12, a HDD (hard disk drive) 14, a communication IF (interface) 16 which performs communication via a network which is not illustrated, an input unit 18, an output unit 20, a reader/writer 22 which can read information stored in a computer-readable storage medium 24 such as a CD (compact disk). These components are connected with each other via a bus 26, and they can input and output data with each other.

The access node 100 and the storage node 200 of which the storage system 1 according to this exemplary embodiment is composed are realized by the CPU 10 executing a computer program (hereinafter, referred to as "program")

stored in the memory 12 or the HDD 14. Alternatively, the information processing apparatus 1 may be realized by the CPU 10 executing a program stored in the storage medium 24. A program executed in the CPU 10 may be acquired from outside via the communication IF 16 or the reader/writer 22. The hardware exemplary configuration of the information processing apparatus 1 shown in FIG. 1 is also applicable in an exemplary embodiment and an example mentioned later.

Figure 3:
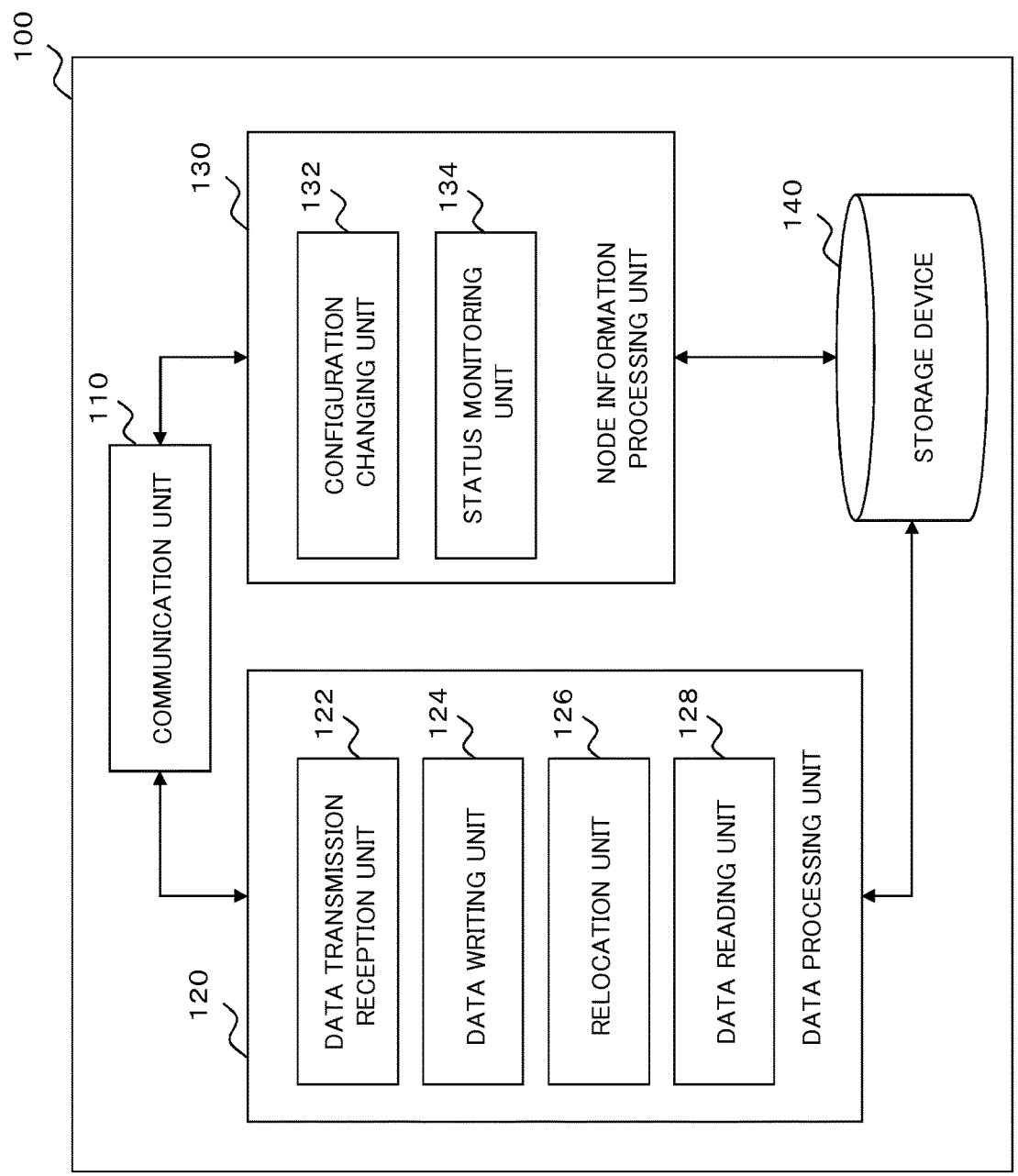
FIG. 3 is a block diagram notionally illustrating a functional constitution of the access node 100 which constitutes a storage system 1 according to the first exemplary embodiment of the present invention.

Next, the access node 100 will be described. FIG. 3 is a block diagram which notionally illustrates a functional constitution of the access node 100 which constitutes the storage system 1 according to the first exemplary embodiment of the present invention. In this regard, however, the functional constitution shown in FIG. 3 is a structure represented for convenience of explanation, and the present invention described taking the exemplary embodiment of the present application as an example is not limited to such structure when it is implemented. As shown in FIG. 3, the access node 100 includes a communication unit 110, a data processing unit 120, a node information processing unit 130 and a storage device 140.

The communication unit 110 is an interface to other nodes which form a client and the storage system 1.

The data processing unit 120 performs processing such as reading and writing data. The data processing unit 120 has a data transmission/reception unit 122, a data writing unit 124, a relocation unit 126 and a data reading unit 128.

The data transmission/reception unit 122 sends and receives data to and from a client and other nodes. For example, the data transmission/reception unit 122 performs processing to send and receive data to and from a client, by using a protocol for file transfer such as NFS (Network File System) and CIFS (Common Internet File System).

The data writing unit 124 performs processing to write data into the storage node 200. Description about details of data writing processing which the data writing unit 124 performs will be made later.

The relocation unit 126 relocates data written in the storage node 200 by the data writing unit 124. Description of details of relocation processing which the relocation unit 126 performs will be made later.

The data reading unit 128 performs processing to read data relocated in the storage node 200 by the relocation unit 126. Description of details of data reading processing which the data reading unit 128 performs will be made later.

The node information processing unit 130 manages an operating status and configuration information of the other nodes. The node information processing unit 130 has a configuration changing unit 132 and a status monitoring unit 134.

The configuration changing unit 132 updates configuration information which is stored in the storage device 140 mentioned later, when there is a change in the configuration of nodes due to performing addition, deletion or the like of a node in the storage system 1. For example, when a node is added newly, the configuration changing unit 132 makes, by updating configuration information, the node added newly available in data writing processing after the update. Also, when a node is added newly, the configuration changing unit 132 may perform relocation processing after updating configuration information in order to reduce a disproportion of data between nodes.

The status monitoring unit 134 updates operation information stored in the storage device 140 when a disk failure, a node failure or the like occurs in the storage system 1. For example, the status monitoring unit 134 may transmit the updated operation information on the local node to other nodes. The status monitoring unit 134 may watch operation information on other nodes.

The storage device 140 can memorize configuration information which is information such as the number, capacities and the like of physical nodes and virtual nodes, operation information which is information such as a disk failure, a node failure or the like, and relocation information which is used for relocation processing, and so on. Specifically, configuration information includes: physical node information which is physical information such as the number of nodes and the like; or capacity unit node information which is information on a virtual node defined according to the capacity of a storage node, failure unit node information which defines a minimum unit of data lost (such as a hard disk and RAID (Redundant Arrays of Inexpensive Disks)) as a virtual node, and so on. Operation information may be used in order not to use a disk or a node in which a failure has occurred in data writing processing. Operation information may be used in order to restore data having been lost due to a disk failure or a node failure.

Figure 4:
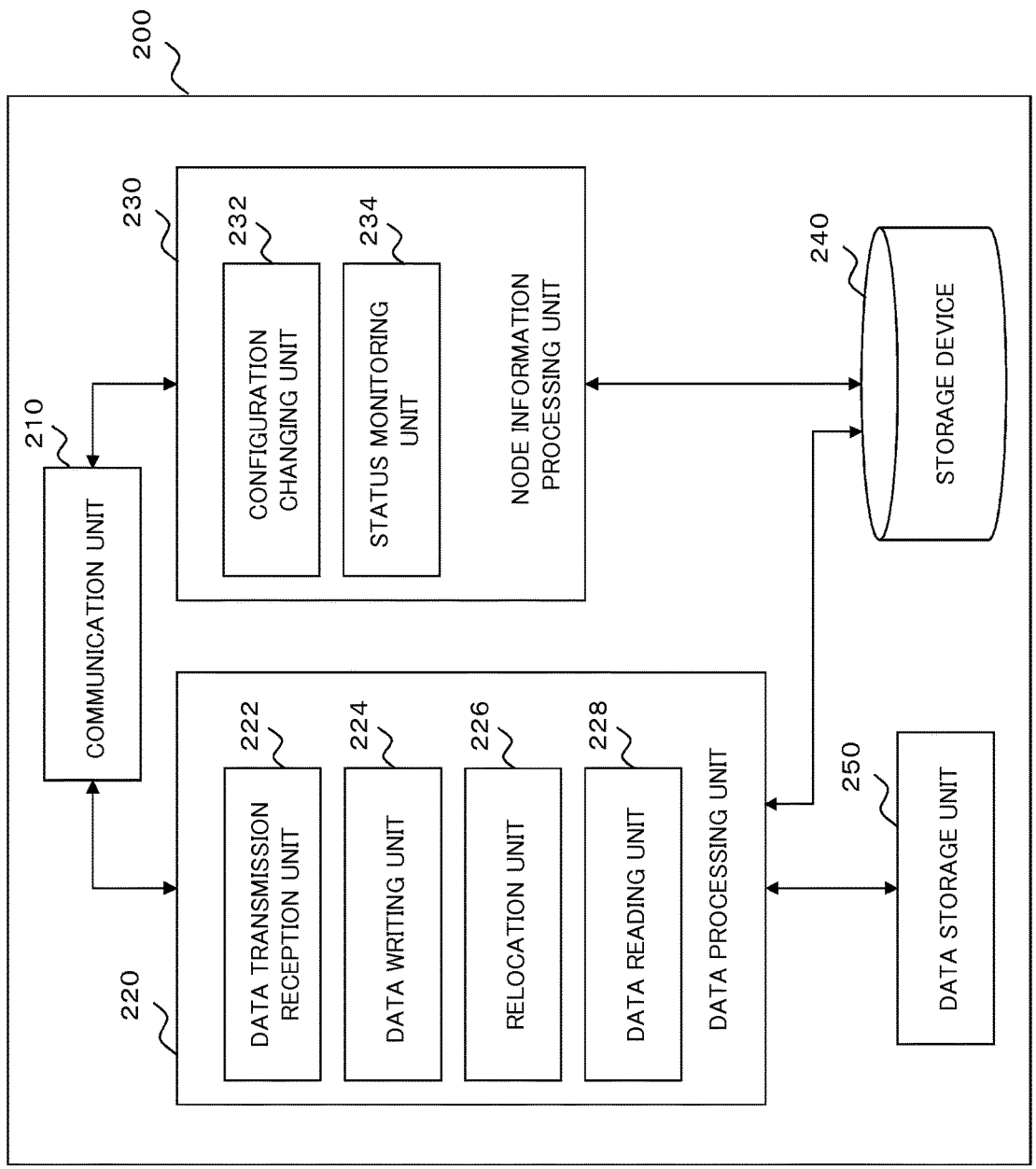
FIG. 4 is a block diagram notionally illustrating a functional constitution of a storage node 200 which constitutes a storage system 1 according to the first exemplary embodiment of the present invention.

Next, the storage node 200 will be described. FIG. 4 is a block diagram which notionally illustrates a functional constitution of the storage node 200 which constitutes the storage system 1 according to the first exemplary embodiment of the present invention. However, the functional constitution shown in FIG. 4 is constitution expressed for convenience of explanation, and the present invention described taking the exemplary embodiment of the present application as an example is not limited to such constitution when it is implemented. As shown in FIG. 4, the storage node 200 includes a communication unit 210, a data processing unit 220, a node information processing unit 230, a storage device 240 and a data storage unit 250. Meanwhile, because the communication unit 210, a node information processing unit 230, the storage device 240 provided in the storage node 200 perform operations similar to those of the communication unit 110, the node information processing unit 130 and the storage device 140 provided in the access node 100, description will be omitted.

The data processing unit 220 has a data transmission/reception unit 222, a data writing unit 224, a relocation unit 226 and a data reading unit 228. The data processing unit 220 basically performs processing similar to the processing of the data processing unit 120 provided in the access node 100 mentioned above. Operations of the data transmission/reception unit 222, the data writing unit 224, the relocation unit 226 and the data reading unit 228 will be described simply respectively. The data transmission/reception unit 222 performs processing to send and receive data to and from the access node 100. The data writing unit 224 perform processing to write data received from the access node 100 into the data storage unit 250. The relocation unit 226 performs relocation processing to move data written in the data storage unit 250 to another storage node 200. The data reading unit 228 performs processing to read data written in the data storage unit 250.

The data storage unit 250 stores metadata which holds information on a storage position of data and the like; and data transmitted from the access node 100. Here, the data storage unit 250 will be described with reference to FIG. 5.

Figure 5:
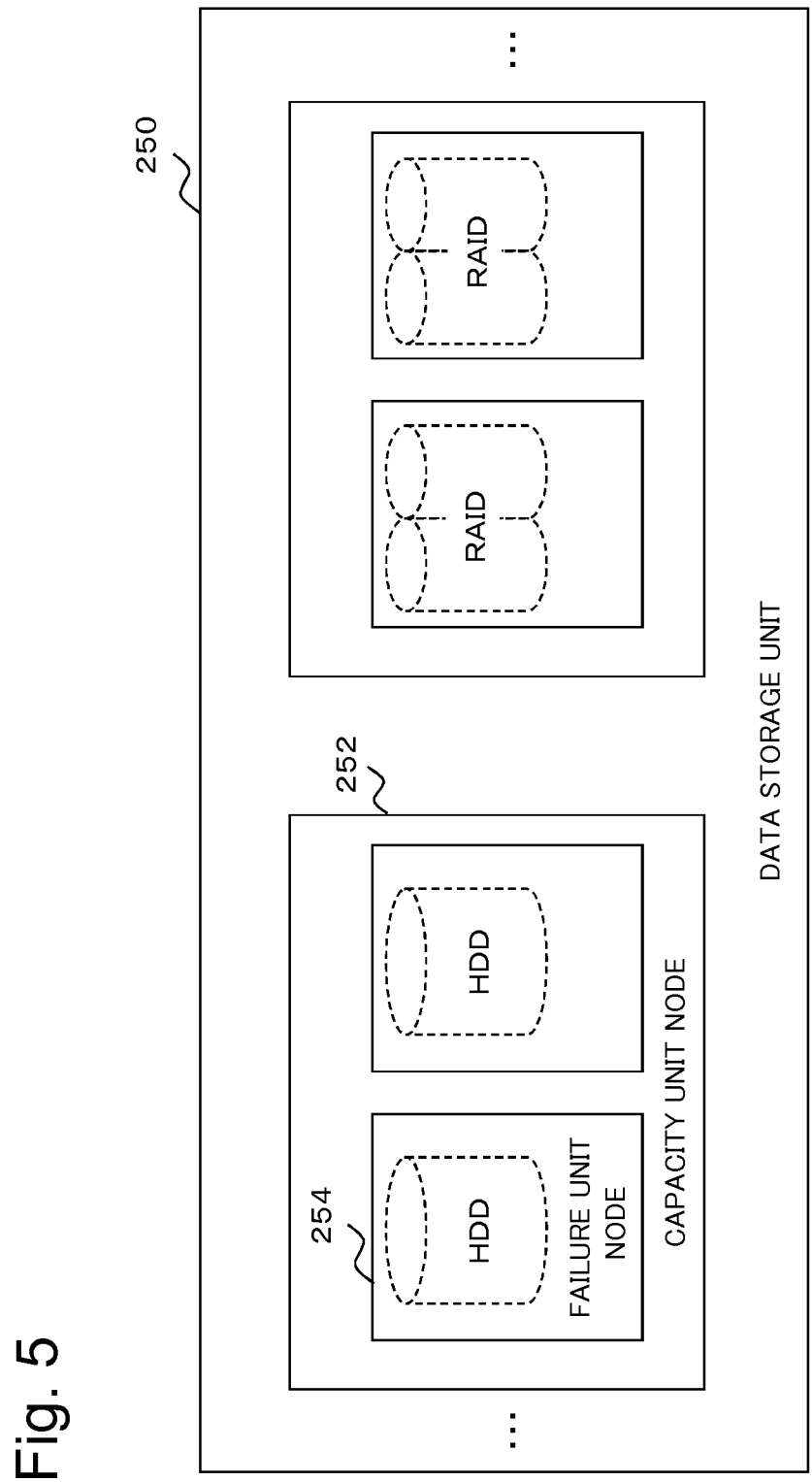
FIG. 5 is a diagram which illustrates a structure of a data storage unit 250 provided in the storage node 200 in the first exemplary embodiment of the present invention.

FIG. 5 is a diagram which illustrates a structure of the data storage unit 250 provided in the storage node 200. As shown in FIG. 5, the data storage unit 250 holds at least one hard disk. For example, in the data storage unit 250, a situation in which each one hard disk is used as a simple volume by giving priority to capacity is considered. Also, in the data storage unit 250, a situation in which a plurality of hard disks are used as a RAID volume by combining them in order to give redundancy is considered. A hard disk which is used as a simple volume mentioned above and a plurality of hard disks used as a RAID volume are defined as a virtual node called a failure unit node 254.

Further, in the storage system 1, a virtual node including at least one failure unit node 254, which is referred to as a capacity unit node 252, is defined for each specific capacity. For example, it is supposed that the capacity of a data storage unit 250A provided in a storage node 200A (the capacity of the storage node A) is three times as large as the capacity of the storage node 200B. In this case, a capacity unit node 252A possessed by the data storage unit 250A provided in the storage node 200A (the capacity unit node 252 held in the storage node 200A) possesses capacity unit node 252 of the number three times as large as the number of capacity unit node 252 that the storage node 200B possesses. Further, it is enabled to read from and write to a hard disk by reading from and writing to the capacity unit node 252.

Next, details about the data writing processing, relocation processing and data reading processing mentioned above will be described.

=Data Writing Processing=

Figure 6:
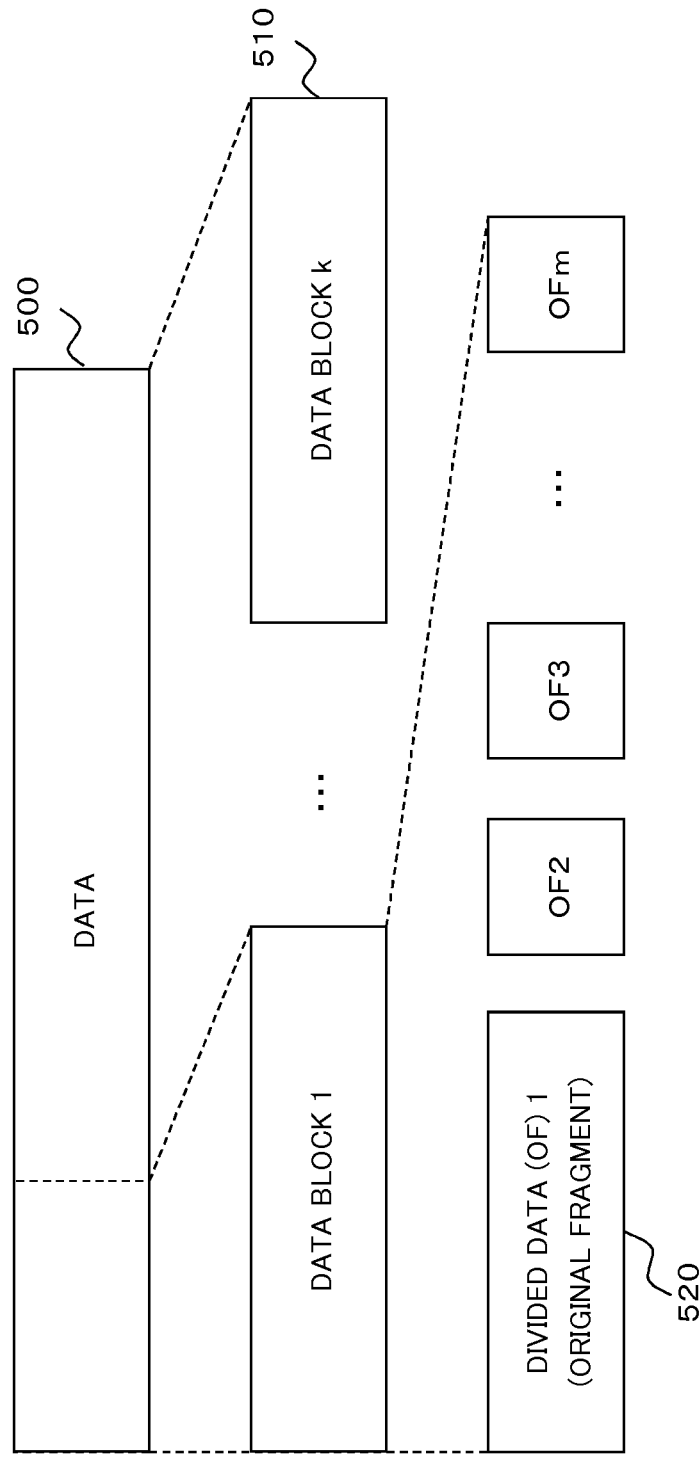
FIG. 6 is a diagram which illustrates data divided by a division processing operation in the first exemplary embodiment of the present invention.

The data writing processing in the access node 100 will be described with reference to FIGS. 6-8.

Figure 8:
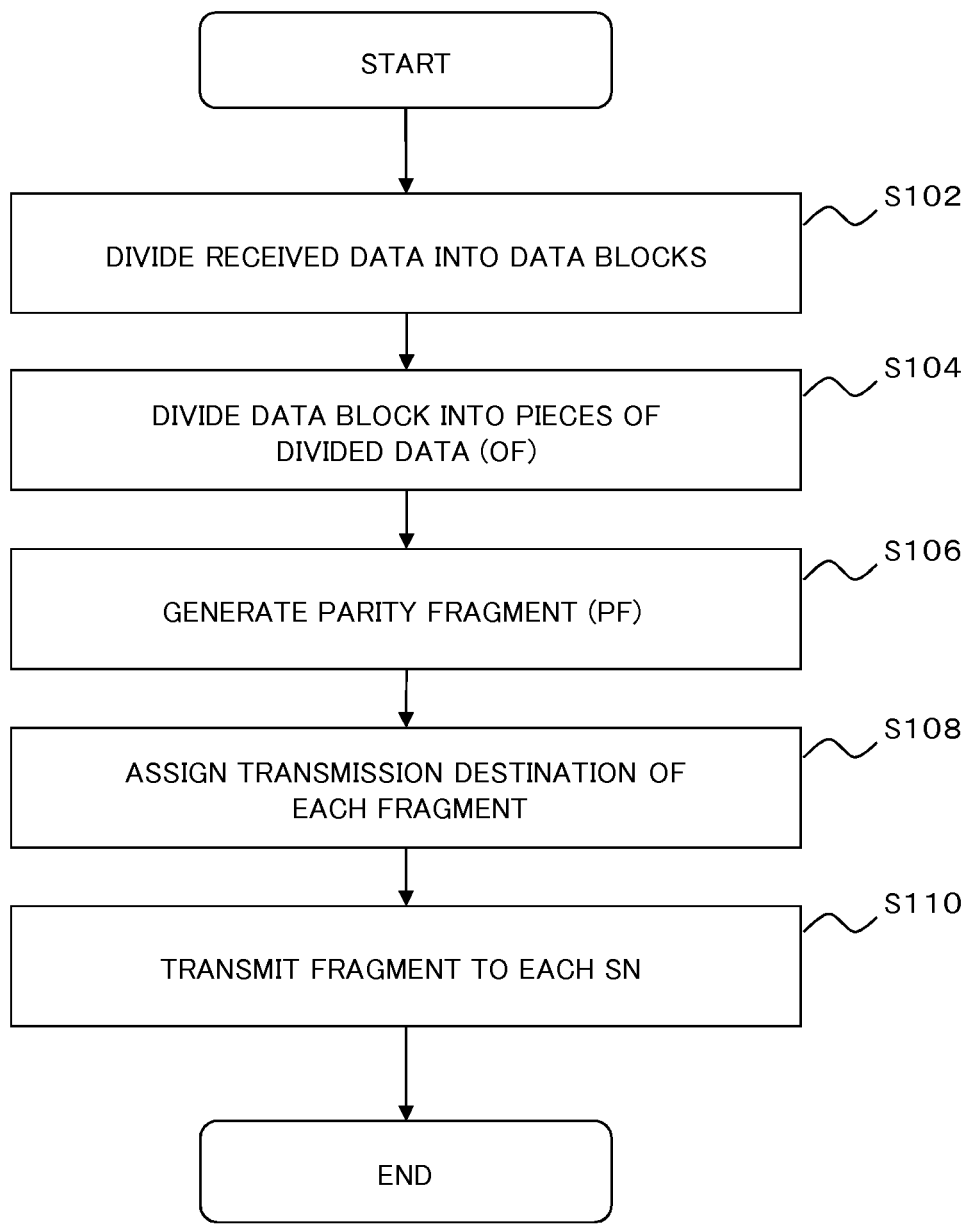
FIG. 8 is a flow chart showing operations of the access node 100 in data writing processing in the first exemplary embodiment of the present invention.

FIG. 8 is a flow chart showing operations of the access node 100 in data writing processing.

As shown in FIG. 8, in Step S102, the data writing unit 124 divides data 500 received by the data transmission/reception unit 122 into pieces of (a plurality of) data block 510 of a fixed length or a variable length.

In Step S104, the data writing unit 124 further divides the divided data block 510 into m pieces. Here, data made by being divided into m pieces is called divided data (original fragment (OF)) 520. A number (a data block number) is assigned to a data block 510 for description of processing mentioned later. The operations in Step S102 and Step S104 will be called a division processing operation. FIG. 6 is a diagram which illustrates data divided by the division processing operation.

In Step S106, the data writing unit 124 generates n pieces of data of parity for error correction by using an error correction code based on the original fragment 520 divided by the division processing operation. Here, the generated n pieces of data of parity are called parity data (parity fragment (PF)) 530. The original fragment 520 and the parity fragment 530 are collectively called as a fragment (F) 540. The operation in Step S106 will be called a coding processing operation.

In Step S108, the data writing unit 124 assigns transmission destinations of (m+n) pieces of fragment 540 generated by the division processing operation and the coding processing operation. An assignment method of transmission destinations of pieces of fragment 540 will be described below with reference to FIG. 7.

Figure 7:
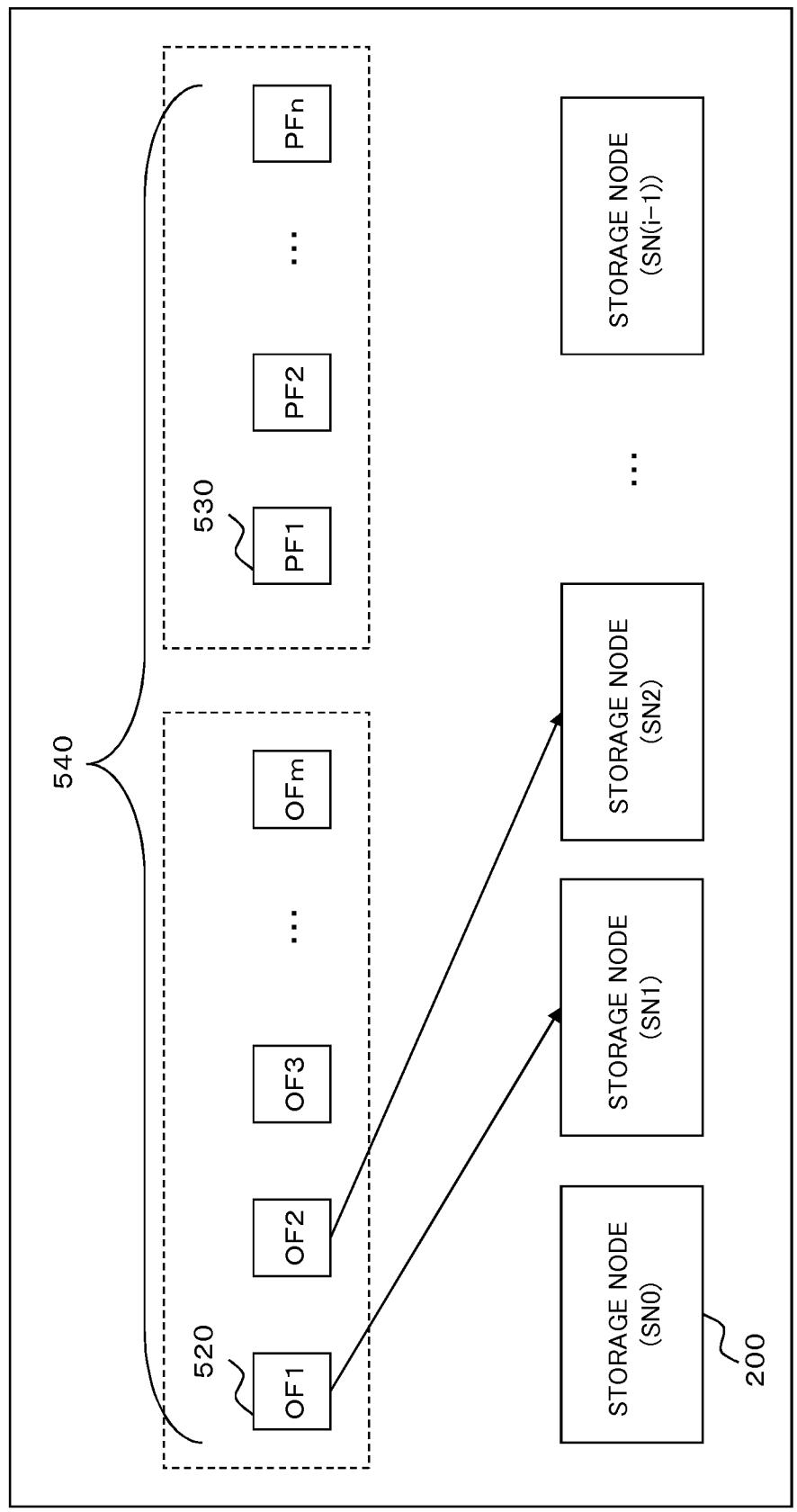
FIG. 7 is a diagram exemplifying an assignment method of a fragment to each storage node 200 in a distributed writing processing operation in the first exemplary embodiment of the present invention.

FIG. 7 is a diagram exemplifying an assignment method of the fragment 540 to each storage node 200 in a distributed writing processing operation. First, it is supposed that the data writing unit 124 assigns a serial number (storage node number) to each storage node 200 in advance. Next, the data writing unit 124 divides a data block number put by the division processing operation by the number of storage nodes, and obtains the remainder. Then, the data writing unit 124 assigns pieces of fragment 540 sequentially starting from the storage node 200 having the same storage number as the remainder. In the example shown in FIG. 7, because the remainder made by dividing the data block number by the number of storage nodes 200 has been one, the data writing unit 124 assigns pieces of fragment 540 starting from the storage node (SN1) 200. Meanwhile, the method of assignment of pieces of fragment 540 to each storage node 200 that has been described is just an example, and pieces of fragment 540 may be assigned to each storage node 200 by other methods such as a round robin method.

In Step S110, the data writing unit 124 transmits each fragment 540 to a storage node 200 having been assigned. The operations in Step S108 and Step S110 will be called a distributed writing processing operation.

In this exemplary embodiment, although it has been explained that the access node 100 carries out the data writing processing operation, it may be carried out by a client. Specifically, a client may carry out the data writing processing operation by installing an application for the data writing processing operation in the client, and transmit the fragment 540 to the storage node 200 directly.

Next, data writing processing in the storage node 200 will be described with reference to FIGS. 9-11.

Figure 11:
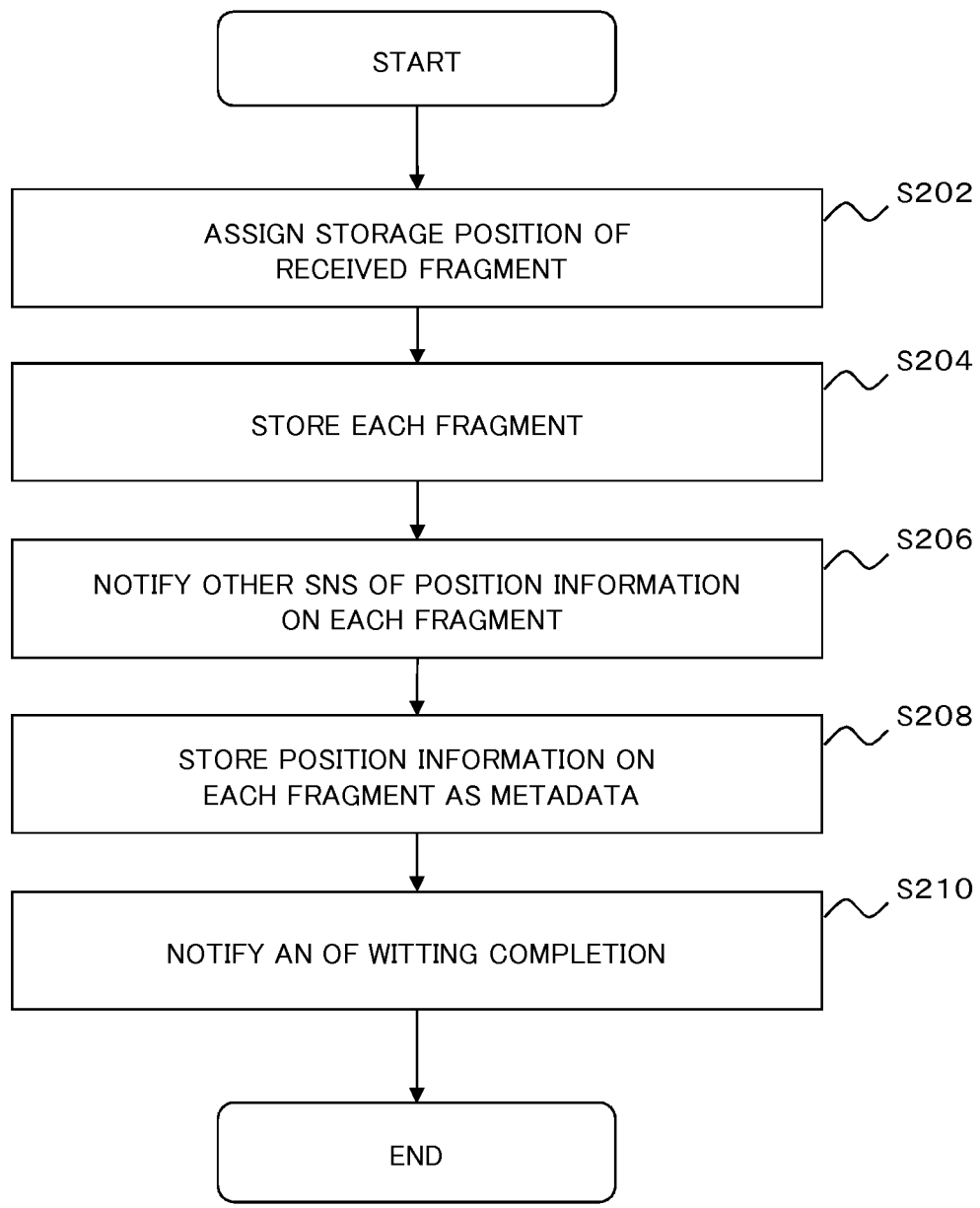
FIG. 11 is a flow chart showing operations of the storage node 200 in data writing processing in the first exemplary embodiment of the present invention.

FIG. 11 is a flow chart showing operations of the storage node 200 in data writing processing.

As shown in FIG. 11, in Step S202, the data writing unit 224 assigns the capacity unit node 252 for storing the fragment 540 received from the access node 100. An assignment method of a storage location of the fragment 540 will be described below with reference to FIG. 9.

Figure 9:
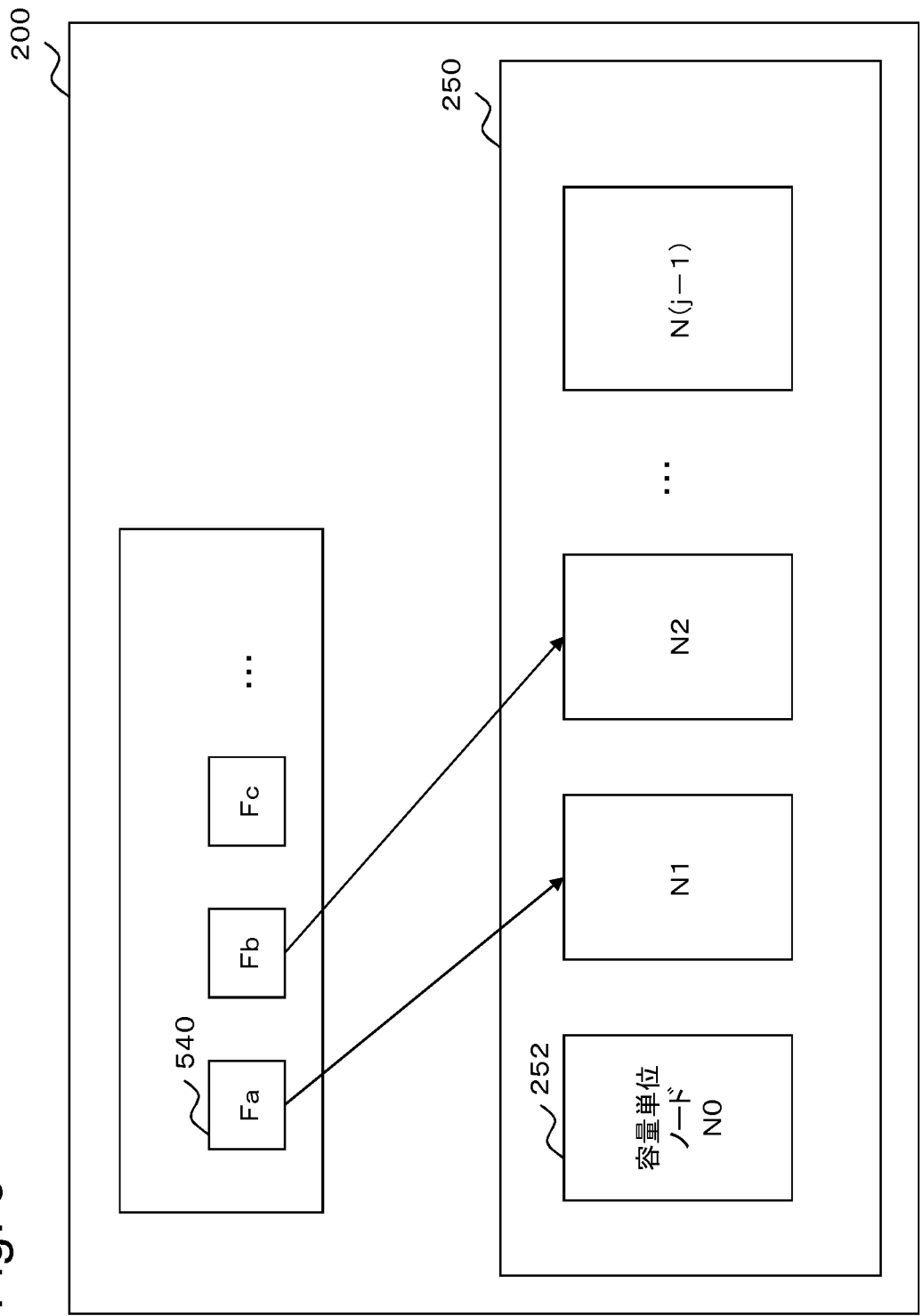
FIG. 9 is a diagram exemplifying an assignment method of a fragment to each capacity unit node 252 in the first exemplary embodiment of the present invention.

FIG. 9 is a diagram exemplifying an assignment method of pieces of fragment 540 to each capacity unit node 252. In FIG. 9, pieces of fragment 540 received from the access node 100 will be called Fa, Fb, Fc and so on. First, it is supposed that the data writing unit 224 assigns serial numbers (capacity unit node numbers) to the capacity unit nodes 252 provided in the storage node 200. Next, the data writing unit 224 divides the data block number by the number of capacity unit nodes 252, and finds the remainder. Then, the data writing unit 224 assigns the pieces of fragment 540 sequentially starting from the capacity unit node 252 having a capacity unit node number the same as the remainder. In an example shown in FIG. 9, because the remainder made by dividing the data block number by the number of capacity unit nodes is one, the data writing unit 124 assigns a fragment 540 (in FIG. 9, Fa) starting from a capacity unit node (N1) 252. Meanwhile, the assignment method of pieces of fragment 540 to each capacity unit node 252 that has been described is just an example, and pieces of fragment 540 may be assigned to each capacity unit node 252 by other methods.

In Step S204, the data writing unit 224 stores the pieces of fragment 540 in the assigned capacity unit nodes. Specifically, the data writing unit 224 stores the fragment 540 in a disk by writing it in the capacity unit node 252.

In Step S206, the data writing unit 224 notifies the other storage nodes 200 of position information on a fragment 540 that has been written (information which indicates the storage node 200 and the capacity unit node 252 storing the fragment 540).

In Step S208, the data writing unit 224 stores storage position information on the fragment 540 into the data storage unit 250 provided in all storage nodes 200 as metadata. That is, it means that all storage nodes 200 store similar metadata. Here, the metadata will be described with reference to FIG. 10. FIG. 10 is a diagram exemplifying metadata representing storage position information on the fragment 540. As shown in FIG. 10, when the original fragment 520 of data block k (that is, its data block number is k) is stored in capacity unit node j (that is, its capacity unit node number is j) in storage node i (that is, its storage node number is i), and its storage position is xxxx, storage position information is indicated like "i-j-xxxx". For example, referring to FIG. 10, the storage position of original fragment 2 of data block k is shown as "2-1-xxxx". Therefore, it is found out that the original fragment 2 of data block k is stored in the location "xxxx" of capacity unit node 1 in storage node 2.

In Step S210, the data writing unit 224 notifies the access node 100 of completion of the writing processing. Also, in addition to the completion notification of the writing processing, the data writing unit 224 notifies the access node 100 of information representing that data block k is a data block for which relocation processing has not been carried out (relocation information).

=Relocation Processing=

Relocation processing will be described with reference to FIGS. 12-16.

Figure 16:
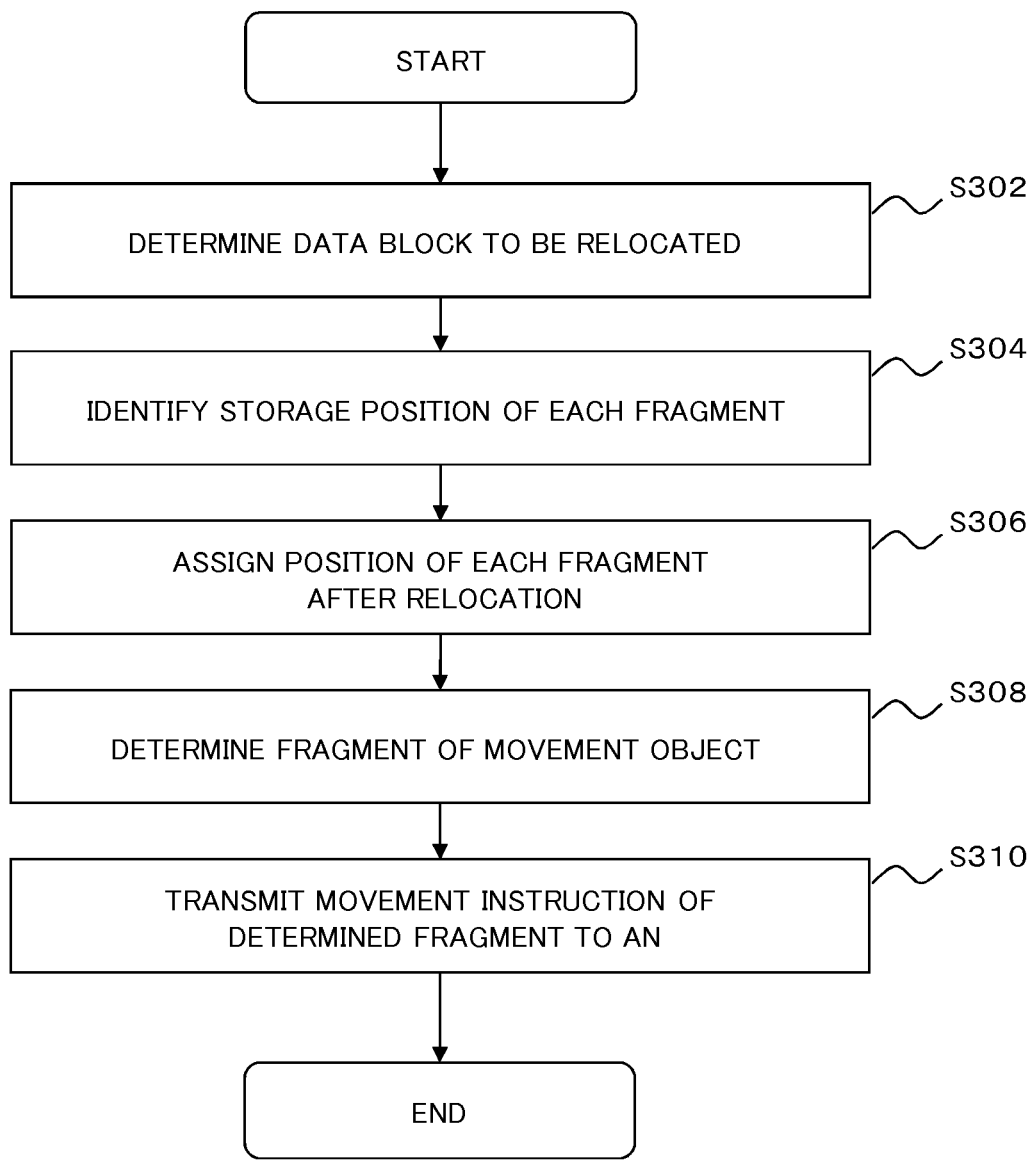
FIG. 16 is a flow chart showing operations of the access node 100 in relocation processing in the first exemplary embodiment of the present invention.

FIG. 16 is a flow chart showing operations of the access node 100 in relocation processing.

As shown in FIG. 16, in Step S302, the relocation unit 126 determines the data block 510 to be relocated. Specifically, the relocation unit 126 refers to relocation information being stored in the storage device 140, and determines the data block 510 to be relocated.

In Step S304, the relocation unit 126 identifies the storage position of each fragment 540. Specifically, by reading metadata stored in the storage node 200, the relocation unit 126 identifies the storage positions of pieces of fragment 540 constituting the data block 510 to be a target of relocation processing. Here, because similar metadata is stored in all storage nodes 200 as it has been described in data writing processing, the relocation unit 126 should simply read metadata stored in any one of the storage nodes 200.

In Step S306, the relocation unit 126 assigns a storage position of each fragment 540 after relocation. Specifically, the relocation unit 126 determines the storage node 200 to be the new assignment destination of the fragment 540 first. Next, in the determined storage node 200, the relocation unit 126 determines to which capacity unit node 252 the fragment 540 is assigned. An assignment method after relocation of the fragment 540 will be described below with reference to FIGS. 12-14.

Figure 12:
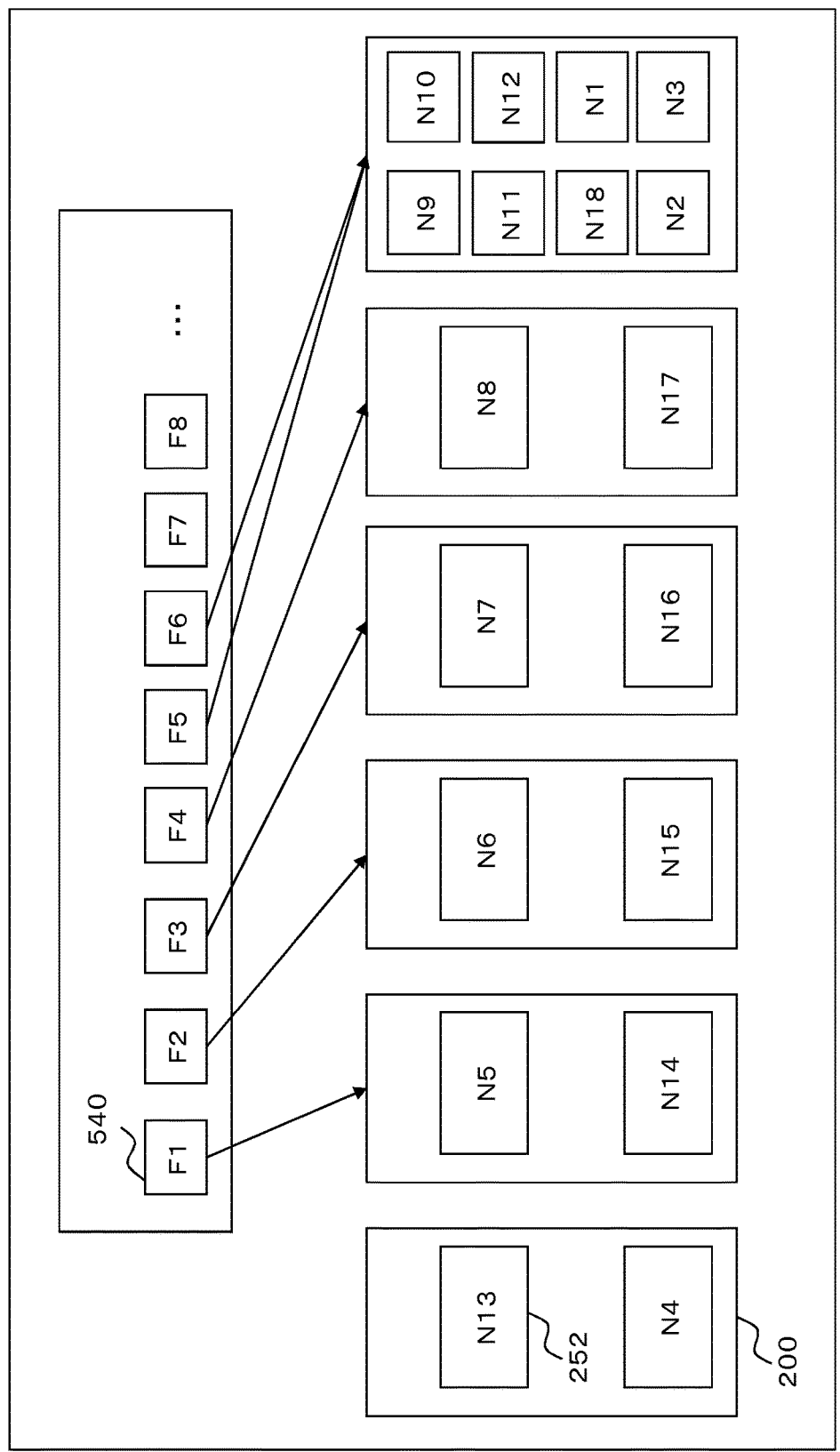
FIG. 12 is a diagram exemplifying an assignment method of a fragment to each storage node 200 in data relocation processing in the first exemplary embodiment of the present invention.

FIG. 12 is a diagram exemplifying an assignment method of the fragment 540 to each storage node 200 in relocation processing. In the following description, the pieces of fragment 540 constituting the data block 510 determined in Step S302 will be indicated as F1, F2 and F3, and so on. First, the relocation unit 126 assigns serial numbers through the whole storage system 1 (system numbers) to capacity unit nodes 252 provided in all storage nodes 200 in advance. On this occasion, the relocation unit 126 performs the numbering so that system numbers may not be too concentrated on the same storage node 200. For example, by using D'Hondt system or the like, the relocation unit 126 may assign a system number to the capacity unit node 252. In the following description, each capacity unit node 252 to which a system number has been assigned will be called as N1, N2, N3, and so on.

Next, the relocation unit 126 finds a remainder made by dividing the data block number by the number of storage nodes, and identifies the storage node 200 having a storage node number the same as the calculated remainder. In the capacity unit nodes 252 provided in the identified storage node 200, the relocation unit 126 identifies a capacity unit node 252 having the smallest system number. The relocation unit 126 assigns pieces of fragment 540 in order of system number starting from the specified capacity unit node 252. Although the relocation unit 126 assigns pieces of fragment 540 in order of system number, it is supposed that an assignment destination is assigned to the storage node 200, not to the capacity unit node 252.

A storage location of the fragment 540 after relocation is determined as mentioned above basically. However, the relocation unit 126 may determine a storage location of the fragment 540 by adding the following condition.

==Condition 1==

Figure 13:
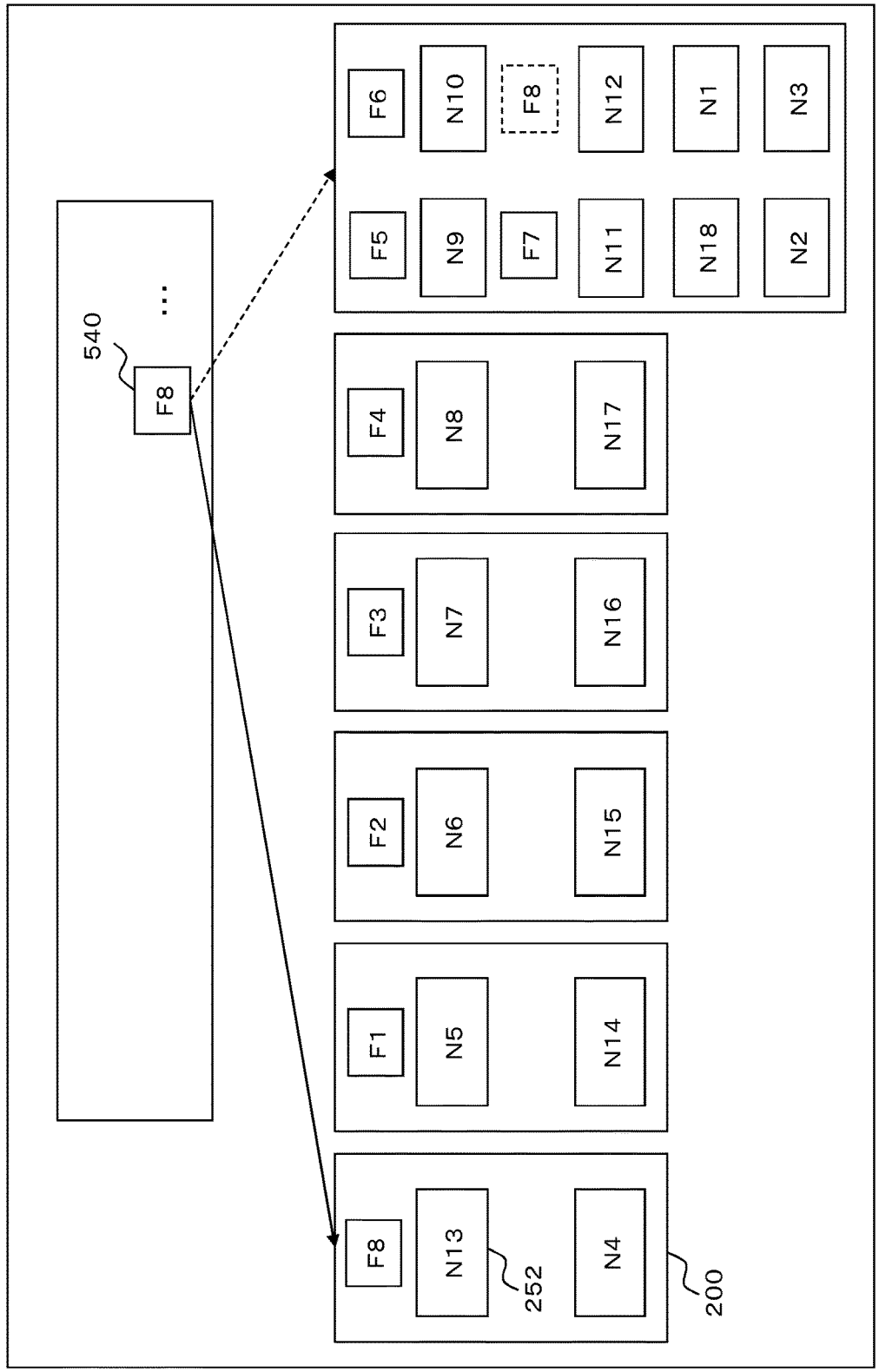
FIG. 13 is a diagram which illustrates an assignment condition 1 of a fragment to each storage node 200 in relocation processing in the first exemplary embodiment of the present invention.

FIG. 13 is a diagram which illustrates a condition 1 of assignment of the fragment 540 to each storage node 200 in relocation processing. In the condition 1, the relocation unit 126 assigns the fragment 540 by focusing attention on the number of pieces of parity fragment 530. Specifically, it is arranged such that, when the number of pieces of fragment 540 having been assigned to a certain storage node 200 has become the same as the number of pieces of parity fragment 530, the relocation unit 126 does not assign the fragment 540 to that storage node 200. In this case, the relocation unit 126 assigns the fragment 540 to the storage node 200 having the capacity unit node 252 with the next system number.

For example, it is supposed that the number of pieces of parity fragment 530 included in the pieces of fragment 540 of which the data block 510 of the target of relocation processing is three. As shown in FIG. 13, a situation that three pieces of fragment 540, F5, F6 and F7, have been assigned to a certain storage node, and, further, a fragment 540 (F8) is going to be assigned to that storage node 200 is considered. In this case, without assigning the fragment 540 to that storage node 200 because three pieces of fragment 540 of F5, F6 and F7 are being assigned to that certain storage node 200, the relocation unit 126 assigns it to the storage node 200 having a capacity unit node 252 of the next system number.

That is, when the fragment 540 (F8) is assigned by the relocation unit 126 based on the basic assignment method, it is assigned to the storage node 200 having the capacity unit node 252 (N12) (a portion represented by the dotted line in FIG. 13). However, when the relocation unit 126 assigns the fragment 540 (F8) according to the condition 1, it assigns the fragment 540 to the storage node 200 having the capacity unit node 252 (N13).

==Condition 2==

Figure 14:
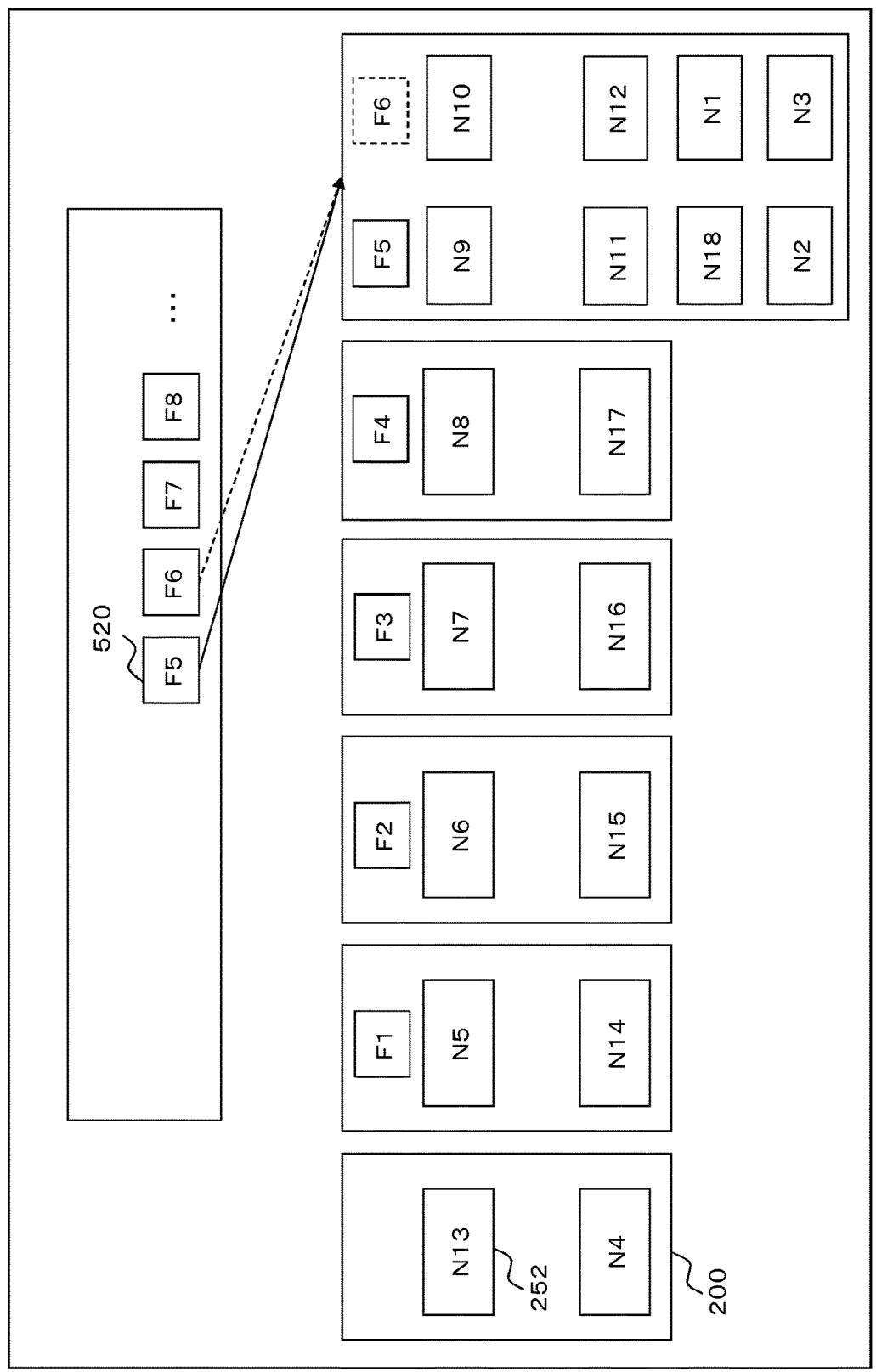
FIG. 14 is a diagram which illustrates an assignment condition 2 of a fragment to each storage node 200 in relocation processing in the first exemplary embodiment of the present invention.

FIG. 14 is a diagram which illustrates a condition 2 of assignment of the fragment 540 to each storage node 200 in relocation processing. In the condition 2, the relocation unit 126 assigns the fragment 540 by focusing on the number of pieces of original fragment 520 that have been already assigned to each storage node 200. Specifically, the relocation unit 126 compares the number of pieces of original fragment 520 that have been already assigned to the storage node 200 to which the fragment 540 is tried to be assigned next to the number of pieces of original fragment 520 that have been already assigned to each of the other storage nodes 200.

As a result, when the number of pieces of original fragment 520 that have been already assigned to each of other storage nodes 200 is larger than or equal to the number of pieces of original fragment 520 that have been already assigned to the storage node 200 to which a fragment 540 is being tried to be assigned next, the relocation unit 126 assigns the next original fragment 520 to the storage node 200 being tried. On the other hand, when there exists a storage node 200 with the number of pieces of original fragment 520 that have been already assigned that is smaller than the number of pieces of original fragment 520 that have been already assigned to the storage node 200 to which the fragment 540 is being tried to be assigned next, the relocation unit 126 assigns a parity fragment 530 to the storage node being tried.

For example, it is supposed that F1-F4 shown in FIG. 14 are pieces of original fragment 520, and they have been already assigned to the storage nodes 200. Next, referring to FIG. 14, at the time when F5 is assigned to the storage node 200 having N9, the relocation unit 126 compares the number of pieces of original fragment 520 that have been already assigned to the storage node 200 having N9 with the number of pieces of original fragment 520 that have been already assigned to each of the other storage nodes 200. As a result of the comparison, the number of pieces of original fragment 520 that have been already assigned to the storage node 200 having N9 is zero, and the number of pieces of original fragment 520 that have been already assigned to each of the other storage nodes 200 is zero or one. As a result, the relocation unit 126 assigns the original fragment 520 to the storage node 200 having N9. Next, referring to FIG. 14, when F6 is assigned to the storage node 200 having N10, the relocation unit 126 compares the number of original fragments of the storage node 200 having N10 with the number of pieces of original fragment 520 that have been already assigned to each of the other storage nodes 200. As a result of the comparison, the number of pieces of original fragment 520 that have been already assigned to the storage node 200 having N10 is one, and it is found that there exists the storage node 200 having the number of pieces of original fragment 520 that have been already assigned that is zero. As a result, the relocation unit 126 assigns a parity fragment 530 to the storage node 200 having N10.

When pieces of fragment 540 that have not been assigned include only the original fragment 520 or only the parity fragment 530, respectively, the relocation unit 126 assigns remaining pieces of the fragment 540 while ignoring the condition 2.

Finally, the relocation unit 126 assigns the fragment 540 assigned to each storage node 200 to a capacity unit node 252 provided in the each storage node 200. The assignment method of the fragment 540 to the each capacity unit node 252 is similar to the method in Step S202 of FIG. 11.

In Step S308, the relocation unit 126 determines the fragment 540 of a movement object. Specifically, the relocation unit 126 compares the storage position of the fragment 540 assigned in Step S306 and the storage position of the fragment 540 before relocation. As a result of comparison, the relocation unit 126 determines the fragment 540 for which movement is needed actually.

Figure 15:
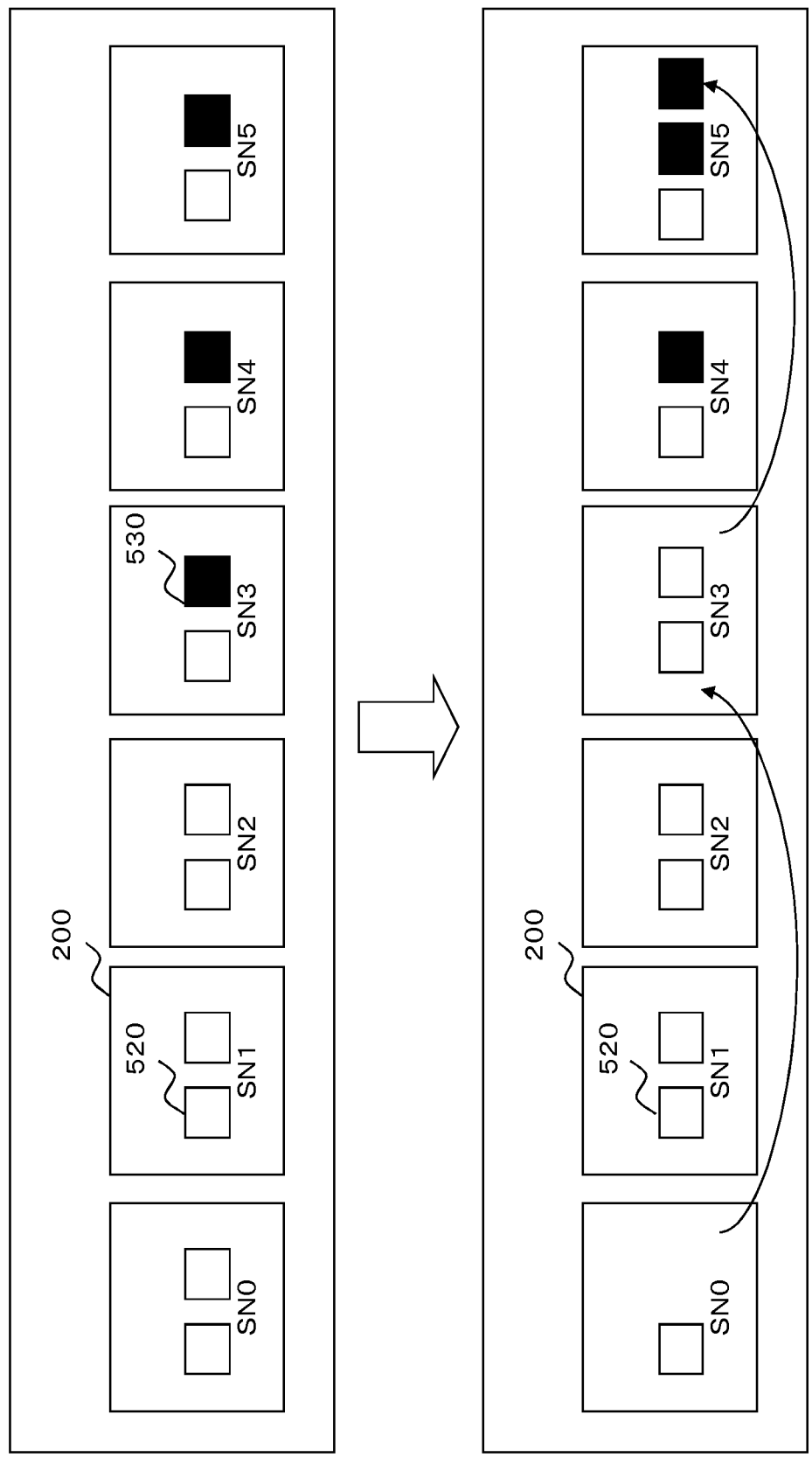
FIG. 15 is a diagram exemplifying a storage position of a fragment in each storage node 200 before relocation and after relocation in the first exemplary embodiment of the present invention.

FIG. 15 is a diagram exemplifying the storage positions of pieces of the fragment 540 before relocation and after relocation in each storage node 200. The upper part of FIG. 15 indicates the storage positions of pieces of the fragment 540 before relocation, and the lower part of FIG. 15 indicates the storage positions of the pieces of fragment 540 after relocation. Referring to FIG. 15, it is found out those storage nodes 200 for which a change occurs in the storage positions of the pieces of fragment 540 are SN0, SN3 and SN5. Accordingly, the relocation unit 126 determines to move the original fragment 520 of SN0 to SN3 and the parity fragment 530 of SN3 to SN5.

In Step S310, the relocation unit 126 transmits a movement instruction of the fragment 540 to the storage node 200. Specifically, the relocation unit 126 transmits to the storage node 200 an instruction which to move the fragment 540 as decided in Step S308.

The relocation processing mentioned above has been described such that it is carried out by issuing an instruction to the storage node 200 by the access node 100. However, the access node 100 does not need to issue an instruction necessarily. For example, in relocation processing, when there is an instruction of relocation processing from a certain storage node 200, it is possible to carry out relocation processing without communicating with the access node 100 by storing relocation information in the storage device 240 provided in the storage node 200.

Also, in the relocation processing mentioned above, relocation processing of a fragment is carried out so that a failure of up to one storage node 200 in a plurality of storage nodes 200 can be endured. Moreover, in relocation processing, it is also possible to make failures of a plurality of storage nodes 200 be able to be endured. Specifically, by reducing the maximum number of pieces of fragment 540 per one piece of storage node 200, it becomes possible to cope with failures of a plurality of storage nodes 200. At that time, a structure by which how many failed storage nodes 200 can be handled can be changed by setting may be adopted.

=Data Reading Processing=

Figure 17:
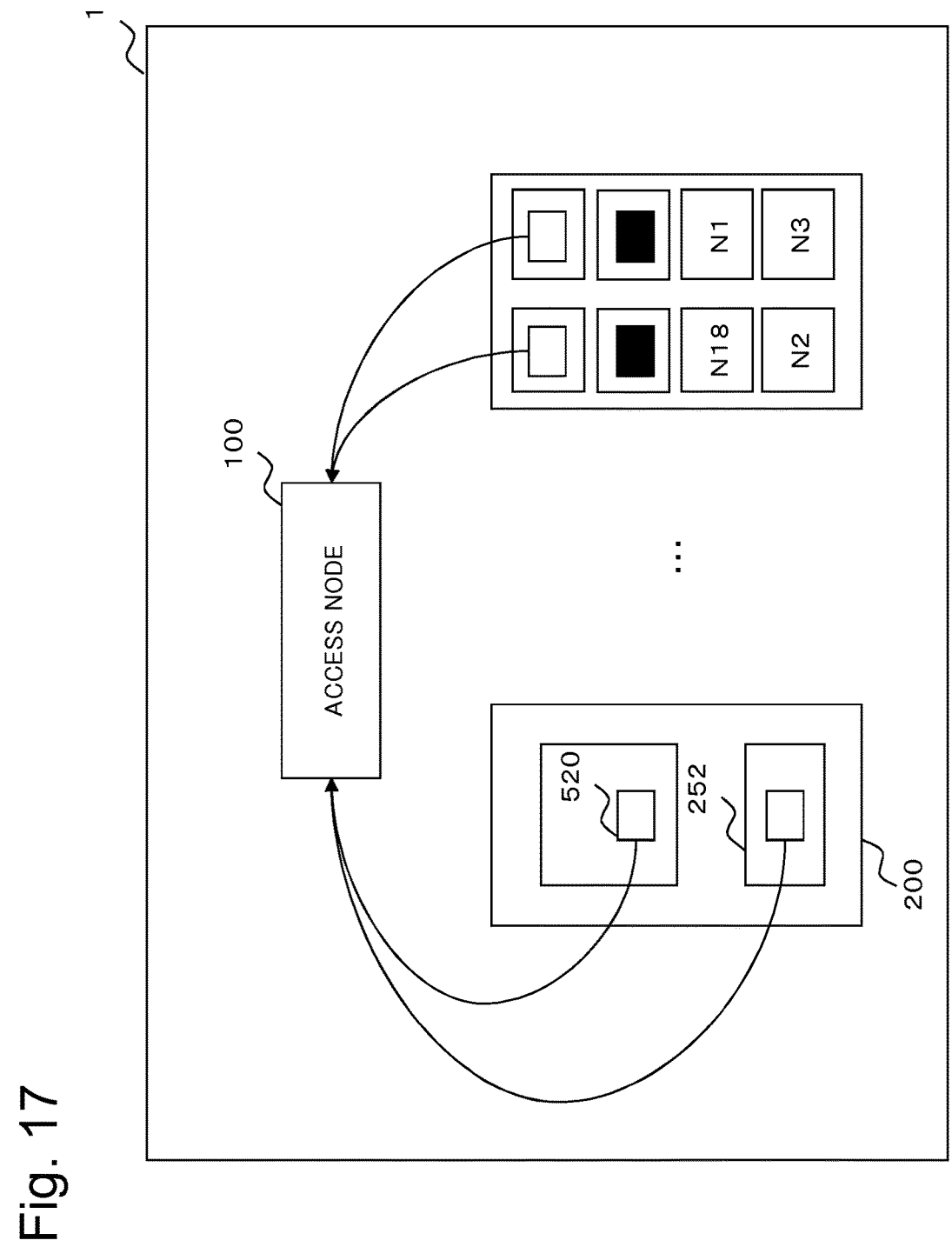
FIG. 17 is a diagram which illustrates processing of transmitting an original fragment to the access node 100 from the storage node 200 in a data reading processing in the first exemplary embodiment of the present invention.

Next, data reading processing will be described with reference to FIG. 17 and FIG. 18.

Figure 18:
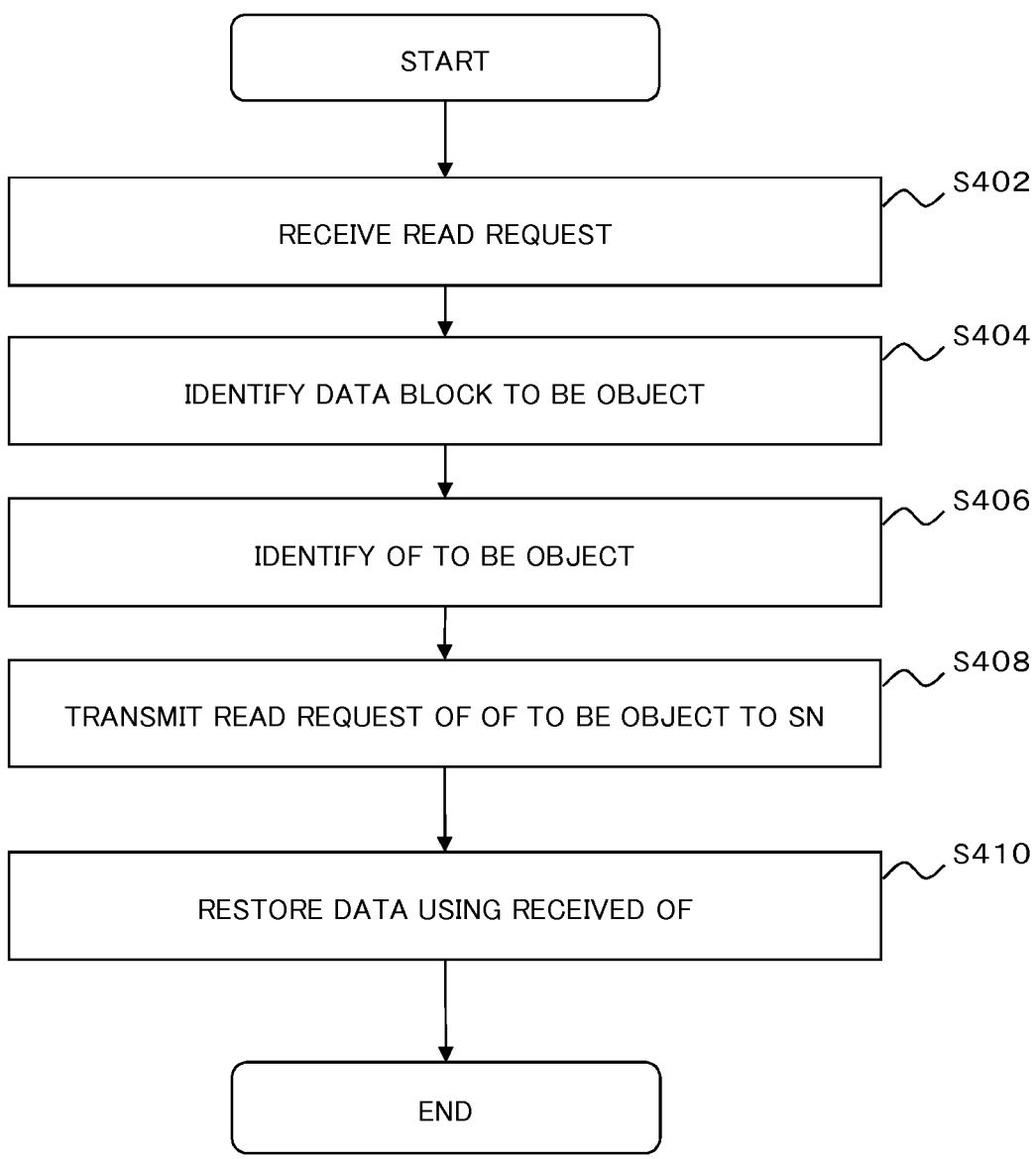
FIG. 18 is a flow chart showing operations of the access node 100 in data reading processing in the first exemplary embodiment of the present invention.

FIG. 18 is a flow chart showing operations of the access node 100 in data reading processing.

As shown in FIG. 18, in Step S402, the data transmission/reception unit 122 receives a Read request (reading request) from a client.

In Step S404, the data reading unit 128 identifies pieces of data block 510 to be a target of reading. Specifically, the data reading unit 128 reads metadata stored in the storage node 200, and identifies the data block 510 corresponding to the data requested by the client. The data reading unit 128 should simply read metadata stored in any one piece of storage node 200 because similar metadata is stored in all storage nodes 200 as it has been described in the data writing processing and the relocation processing.

In Step S406, the data reading unit 128 identifies pieces of original fragment 520 to be a target of reading. Specifically, the data reading unit 128 identifies the storage positions of the pieces of original fragment 520 constituting a data block 510 in question identified in Step S404 based on the metadata.

In Step S408, the data transmission/reception unit 122 transmits a Read request of the original fragment 520 to be the target of reading to the storage node 200.

Here, operations for transmitting the original fragment 520 for which a Read request has been issued to the access node 100 from the storage node 200 will be described. In data reading processing, FIG. 17 is a diagram which illustrates processing to transmit the original fragment 520 to the access node 100 from the storage node 200. As shown in FIG. 17, the storage node 200 reads only the original fragment 520 and transmits it to the access node 100. When there exist the original fragment 520 that has not be able to be read, for example, it is supposed that all fragments 540 of which data block of the target is composed (including the parity fragment 530) are read.

In Step S410, the storage node 200 restores data using the received pieces of original fragment 520.

As it has been described above, the storage system 1 according to the first exemplary embodiment of the present invention can prevent performance deterioration and keep fault tolerance in a storage system having storage nodes of different capacities.

Specifically, the storage system 1 can prevent performance deterioration of data writing. A reason of this is that the data writing unit 124 writes data equally to storage nodes at the time of data writing processing. Another reason is that the relocation unit 126 performs relocation processing after data writing processing by the data writing unit 124 has been completed.

The storage system 1 can prevent performance deterioration of data reading. A reason of this is that, on the occasion of data reading processing by the data reading unit 128, the parity fragment 530 is not read, and only the original fragment 520 is read. Another reason is that, by the relocation unit 126 performing relocation processing so that the storage node 200 that has a larger capacity may store a larger number of pieces of parity fragment 530 (that is, relocation processing is performed so that the number of pieces of original fragment 520 in each storage node 200 may become equal), a load is not made to concentrate on the storage node 200 of a large capacity at the time of data reading processing.

According to the storage system 1, when the number of pieces of parity fragment 530 is n, data loss is not caused up to n coincident failures of disks. Further, according to the storage system 1, even if those n coincident failures occur in one storage node, data loss is not caused. The reason is that the relocation unit 126 performs relocation processing according to a predetermined condition so that fault tolerance may not be lost.

Even in a case where the number of pieces of storage nodes 200 is not large compared with the number of fragment 540, the present invention can applied to the storage system 1. The reason is that data is stored by defining a virtual node that is the capacity unit node 252. Therefore, by increasing the number of virtual nodes, the number of nodes for storing virtually can be adjusted.

Second Exemplary Embodiment

Figure 19:
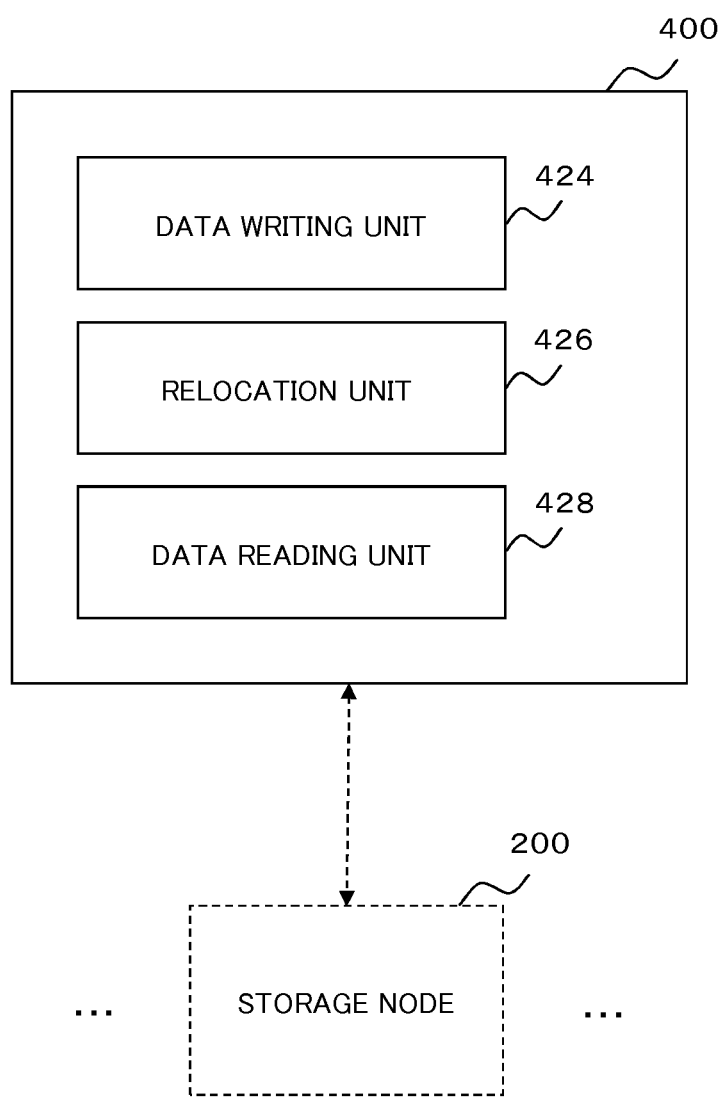
FIG. 19 is a block diagram which notionally illustrates a functional constitution of an information processing apparatus 400 according to a second exemplary embodiment of the present invention.

An information processing apparatus 400 according to the second exemplary embodiment of the present invention will be described. FIG. 19 is a block diagram which notionally illustrates a functional constitution of the information processing apparatus 400 according to the second exemplary embodiment of the present invention. The information processing apparatus 400 according to the second exemplary embodiment of the present invention is of a structure common to the exemplary embodiment mentioned above.

A data writing unit 424 divides received data into a plurality of divided data, generates a plurality of pieces of parity data that can be used when the received data in which an error has occurred is re-configured, and transmits the divided pieces of data and the pieces of parity data to a plurality of storage nodes 200.

A relocation unit 426 assigns relocation positions of the data written by the data writing unit to the plurality of storage nodes 200 based on a predetermined condition, and stores the data in the assigned storage nodes.

By identifying parity data stored in the plurality of storage node 200, a data reading unit 428 reads the divided pieces of data so as not to read the parity data.

As it has been described above, in a storage system having storage nodes of different capacities, the information processing apparatus 400 according to the second exemplary embodiment of the present invention can prevent performance deterioration and keep fault tolerance.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

INDUSTRIAL APPLICABILITY

As an example of utilization of the present invention, a grid storage system which integrates a plurality of storage devices into one virtual storage device is considered. Also, it can be thought that the present invention can be used for storage having a duplication exclusion function.

DESCRIPTION OF SYMBOLS

1 Storage system
10 CPU
12 Memory
14 HDD
16 Communication IF
18 Input unit
20 Output unit
22 Reader/writer
24 Storage medium
26 Bus
100 Access node
200 Storage node
300 Network
110, 210 Communication unit
120, 220 Data processing unit
122, 222 Data transmission/reception unit
124, 224, 424 Data writing unit
126, 226, 426 Relocation unit
128, 228, 428 Data reading unit
130, 230 Node information processing unit
132, 232 Configuration changing unit
134, 234 Status monitoring unit
140, 240 Storage device
250 Data storage unit
252 Capacity unit node
254 Failure unit node
500 Data
510 Data block
520 Divided data (original fragment).
530 Parity data (parity fragment)
540 Fragment

The invention claimed is:

1. An information processing apparatus, comprising:
a data writing unit to divide received data into a plurality of divided data, generate a plurality of parity data which is in a plurality of nodes and usable when re-configuring the received data having an error, and write divided data and parity data in a plurality of storage nodes, the divided data in one node can be relocated to the other node and assignment of the parity data can be changed;

a relocation unit to assign a relocation position of the data written by the data writing unit to the plurality of storage nodes based on a predetermined condition and store the data in the assigned storage nodes in such a way as to relocate the divided data from one node to another node and to change the assignment of the location of the parity data; and a data reading unit to read the divided data so as not to read parity data stored in the plurality of storage nodes by identifying the parity data, wherein when a number of the divided data having been assigned to a given storage node has become the same as a number of parity data generated by the data writing unit, the relocation unit does not assign the divided data to the given storage node and instead assigns the divided data to a storage node that has a next system number in relation to a system number of the given storage node, wherein, when assigning a relocation position to the plurality of storage nodes, if there is a storage node of the plurality of storage nodes which has been assigned a smaller number of divided data than the number of divided data assigned to another storage node of the plurality of storage nodes and which is targeted to assign divided data of interest by the relocation unit, the relocation unit assigns the relocation position so that the parity data is stored in the storage node which is targeted to assign the divided data of interest by the relocation unit, otherwise the relocation unit assigns the relocation position so that the divided data is stored in the storage node which is targeted to assign the divided data of interest by the relocation unit, wherein the data writing unit, the relocation unit, and the data writing unit cooperatively prevent a risk that fault tolerance cannot be maintained as to the parity data.

2. The information processing apparatus according to claim 1, wherein
the relocation unit assigns a relocation position so as to store a larger amount of data in a large capacity storage node among the plurality of storage nodes.

3. The information processing apparatus according to claim 2, wherein
the relocation unit assigns a relocation position so as to store a larger amount of the parity data in the large capacity storage node.

4. The information processing apparatus according to claim 1, wherein, when assigning a relocation position to the plurality of storage nodes, upon data not having been assigned a relocation position yet including only the divided data or only the parity data, the relocation unit assigns a relocation position so as to store remaining data in the plurality of storage nodes.

5. The information processing apparatus according to claim 1, wherein, when reading the divided data stored in the plurality of storage nodes, upon divided data not to be able to be read existing in the divided data, the data reading unit reads the parity data.

6. A storage system, comprising the information processing apparatus according to claim 1 and the storage node being connected with each other via a network.

7. The information processing apparatus according to claim 1, wherein data loss is prevented up to a coincident number of disk failures equal to the number of the divided data.

8. An information processing method, comprising:
dividing received data into a plurality of divided data, generating a plurality of parity data which is in a plurality of nodes and usable when re-configuring the received data having an error, and writing the divided data and the parity data to a plurality of storage nodes, the divided data in one node can be relocated to the other node and assignment of the parity data can be changed;

assigning a relocation position of the data written by the data writing unit to the plurality of storage nodes based on a predetermined condition and store the data in the assigned storage nodes in such a way as to relocate the divided data from one node to another node and to change the assignment of the location of the parity data; and reading the divided data so as not to read parity data stored in the plurality of storage nodes by identifying the parity data, wherein when a number of the divided data having been assigned to a given storage node has become the same as a number of parity data that has been generated, the divided data is not assigned to the given storage node and instead the divided data is assigned to a storage node that has a next system number in relation to a system number of the given storage node, wherein, when assigning a relocation position to the plurality of storage nodes, if there is a storage node of the plurality of storage nodes which has been assigned a smaller number of divided data than the number of divided data assigned to another storage node of the plurality of storage nodes and which is targeted to assign divided data of interest, assigning the relocation position so that the parity data is stored in the storage node which is targeted to assign the divided data of interest, otherwise assigning the relocation position so that the divided data is stored in the storage node which is targeted to assign the divided data of interest, wherein the method prevents a risk that fault tolerance cannot be maintained as to the parity data.

9. A non-transitory computer readable storage medium storing a computer program causing a computer to execute:
processing of dividing received data into a plurality of divided data, generating a plurality of parity data which is in a plurality of nodes and usable when re-configuring the received data having an error, and transmitting the divided data and the parity data to a plurality of storage nodes, the divided data in one node can be relocated to the other node and assignment of the parity data can be changed;

processing of assigning a relocation position of the data written by the data writing unit to the plurality of storage nodes based on a predetermined condition and store the data in the assigned storage nodes in such a way as to relocated the divided data from one node to another node and to change the assignment of the location of the parity data; and processing of reading the divided data so as not to read parity data stored in the plurality of storage nodes by identifying the parity data, wherein when a number of the divided data having been assigned to a given storage node has become the same as a number of parity data that has been generated, the divided data is not assigned to the given storage node and instead the divided data is assigned to a storage node that has a next system number of the given storage node, wherein, when assigning a relocation position to the plurality of storage nodes, if there is a storage node of the plurality of storage nodes which has been assigned a smaller number of divided data than the number of divided data assigned to another storage node of the plurality of storage nodes and which is targeted to assign divided data of interest, assigning the relocation position so that the parity data is stored in the storage node which is targeted to assign the divided data of interest, otherwise assigning the relocation position so that the divided data is stored in the storage node which is targeted to assign the divided data of interest, wherein execution of the program prevents a risk that fault tolerance cannot be maintained as to the parity data.

\* \* \* \* \*